(12) United States Patent
Tokuda et al.

(10) Patent No.: US 8,059,253 B2
(45) Date of Patent: Nov. 15, 2011

(54) COLOR FILTER SUBSTRATE HAVING SPACERS OF DIFFERENT HEIGHTS AND LIQUID CRYSTAL DISPLAY COMPRISING SAME

(75) Inventors: Tsuyoshi Tokuda, Tsu (JP); Toshihide Tsubata, Tsu (JP); Akihiro Shohraku, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 498 days.

(21) Appl. No.: 12/096,441

(22) PCT Filed: Dec. 1, 2006

(86) PCT No.: PCT/JP2006/324095
§ 371 (c)(1),
(2), (4) Date: Jun. 6, 2008

(87) PCT Pub. No.: WO2007/066598
PCT Pub. Date: Jun. 14, 2007

(65) Prior Publication Data
US 2009/0161046 A1 Jun. 25, 2009

(30) Foreign Application Priority Data
Dec. 9, 2005 (JP) .................................. 2005-357016

(51) Int. Cl.
*G02F 1/1339* (2006.01)
(52) U.S. Cl. ........................................ 349/155; 349/157
(58) Field of Classification Search .................. 349/155, 349/157
See application file for complete search history.

(56) References Cited

U.S. PATENT DOCUMENTS
6,414,733 B1 * 7/2002 Ishikawa et al. .............. 349/110
(Continued)

FOREIGN PATENT DOCUMENTS
JP 2001-051266 A 2/2001

OTHER PUBLICATIONS
Official communication issued in the International Application No. PCT/JP2006/324095, mailed on Mar. 6, 2007.
(Continued)

*Primary Examiner* — Michael Caley
(74) *Attorney, Agent, or Firm* — Keating & Bennett, LLP

(57) ABSTRACT

A color filter substrate in which the heights of columnar spacers can be arbitrarily controlled by a simple manufacturing process, and a liquid crystal display device including such a color filter substrate are provided. The color filter substrate includes a transparent substrate, a light-shield layer and a color filter layer provided on the transparent substrate, columnar spacers sticking out of the transparent substrate, and a protrusion to control the orientation of liquid crystal molecules. The color filter layer includes first, second and third color filters transmitting light rays in different colors. The columnar spacers include first and second types of columnar spacers with different heights. Each spacer of the first type includes a first lower structure, including at least one layer made of the same film as at least one of the first, second and third color filters and the light-shield layer, and a first upper structure, including a layer made of the same film as the protrusion. Each spacer of the second type includes a second lower structure, including at least one layer made of the same film as at least one of the first, second and third color filters and the light-shield layer, and a second upper structure, including a layer made of a resin.

24 Claims, 16 Drawing Sheets

U.S. PATENT DOCUMENTS

| | | |
|---|---|---|
| 6,661,788 B2 | 12/2003 | Takeda et al. |
| 6,870,593 B2 | 3/2005 | Satoh |
| 7,167,224 B1 | 1/2007 | Takeda et al. |
| 7,224,421 B1 | 5/2007 | Takeda et al. |
| 7,227,606 B2 | 6/2007 | Takeda et al. |
| 7,304,703 B1 | 12/2007 | Takeda et al. |
| 2001/0026347 A1 | 10/2001 | Sawasaki et al. |
| 2005/0088606 A1* | 4/2005 | Ashizawa et al. ............. 349/156 |
| 2005/0237470 A1 | 10/2005 | Kadotani |
| 2005/0275768 A1 | 12/2005 | Tsubata et al. |
| 2007/0064187 A1 | 3/2007 | Takeda et al. |

OTHER PUBLICATIONS

English translation of official communication issued in counterpart International Application No. PCT/JP2006/324095, mailed on Jun. 19, 2008.

* cited by examiner

COLOR FILTER SUBSTRATE HAVING SPACERS OF DIFFERENT HEIGHTS AND LIQUID CRYSTAL DISPLAY COMPRISING SAME

BACKGROUND OF THE INVENTION

1. Field of the Invention

The present invention relates to a color filter substrate for a liquid crystal display device and more particularly relates to a color filter substrate including columnar spacers. The present invention also relates to a liquid crystal display device including such a color filter substrate.

2. Description of the Related Art

In color LCDs used extensively today, a color filter is provided for each and every picture element (dot). Typically, three types of color filters for the three primary colors of light (i.e., red (R), green (G) and blue (B)) are arranged in a predetermined pattern for respective picture elements. In this case, a set of three picture elements (dots) provided with the R, G and B color filters form a single pixel, which can be the smallest unit to conduct a color display operation.

However, the colors of color filters (or picture elements) to be used as a single set do not have to be R, G and B but may also be a combination of cyan (C), magenta (M) and yellow (Y) or a set of any other suitable colors. Also, as is well known in the art, a striped arrangement, a delta arrangement or a mosaic arrangement may be adopted for those color filters.

In an LCD, a liquid crystal layer is usually arranged between two substrates, one of which includes a color filter layer where a plurality of color filters are provided for respective picture elements. For example, in a TFT LCD, a liquid crystal layer is interposed between a TFT substrate on which picture element electrodes, TFTs and other circuit components are arranged and a counter substrate including a counter electrode and a color filter layer thereon. An LCD including a color filter layer on a TFT substrate is also known. However, most of LCDs currently on the market include a color filter layer on the counter substrate. That is why such a counter substrate with a color filter layer is often called a "color filter substrate".

To control the thickness of a liquid crystal layer (which is also called a "cell gap") in bonding a color filter substrate and a TFT substrate together, spacers are provided. However, as the display quality of LCDs has improved more and more significantly, deterioration in display quality due to the presence of those spacers has become an increasingly serious issue.

Specifically, in the prior art, bead-like or rod-like spacers with a predetermined diameter are scattered on the surface of a color filter substrate or a TFT substrate. That is why it is difficult to arrange those spacers at a uniform density over the entire display screen. As a result, the cell gap may vary significantly from one position to another or the spacers may collect together locally, thus sometimes causing defects in display. Also, when those spacers are arranged inside a picture element, the aperture ratio of the LCD may decrease substantially or those spacers may be sensed as bright spots to the viewer's eyes.

In view of these considerations, a method of selectively arranging the spacers in a predetermined area outside of each picture element (which is typically an area shielded from external light with a black matrix) was developed. For example, a method of forming columnar spacers in such a predetermined area by a photolithographic process using a photosensitive resin (which is often called a "photoresist") has been actually used in manufacturing facilities.

The deterioration in display quality as mentioned above can be minimized by controlling the cell gap with columnar spacers. However, to further improve the display quality, various methods of arranging or forming those columnar spacers have been proposed.

For instance, Japanese Patent Application Laid-Open Publication No. 2003-84289 discloses techniques for minimizing production of bubbles in a liquid crystal layer at a low temperature and increasing the withstand load thereof by providing two types of columnar spacers of mutually different heights on a color filter substrate.

FIGS. 21A and 21B illustrate a color filter substrate 70 disclosed in Japanese Patent Application Laid-Open Publication No. 2003-84289. As shown in FIG. 21A, this color filter substrate 70 includes columnar spacers 76 and 77, which are arranged outside of picture elements. In the area outside of the picture elements on the color filter substrate 70, a black matrix 72, color filters 73, 74, and a common electrode 75 are stacked one upon the other on a transparent substrate 71 and the columnar spacers 76 and 77 are arranged thereon as shown in FIG. 21B.

The color filter 73 and its adjacent color filter 74 have mutually different thicknesses, and therefore, the columnar spacers 76 and 77 arranged on the color filters 73 and 74, respectively, have different heights.

Generally speaking, in an LCD that uses columnar spacers, if the density of columnar spacers (i.e., the number of columnar spacers per unit area) were increased to enhance the withstand load thereof, then it would be more and more difficult for the cell gap to catch up with the shrinkage of a liquid crystal layer that could occur at a low temperature. As a result, bubbles would be produced in the liquid crystal layer (which phenomenon will be referred to herein as "low-temperature bubbling").

If the two types of columnar spacers 76 and 77 with different heights were arranged such that the cell gap is controllable with only the higher columnar spacers 76 in most cases as disclosed in Japanese Patent Application Laid-Open Publication No. 2003-84289, then the effective spacer density would be defined by only the higher columnar spacers 76. In that case, the cell gap could catch up with the shrinkage of the liquid crystal layer more easily. Also, if the cell gap decreased upon the application of load to the liquid crystal panel, the two substrates would be supported by both the higher and lower columnar spacers 76 and 77 alike (and the effective spacer density would be defined by both of the two types of columnar spacers 76 and 77 in that case). Consequently, high withstand load would be realized.

Furthermore, to realize an even more uniform cell gap, the columnar spacers are preferably provided in not just the display area but also a non-display area surrounding the display area. However, different structures are defined in the display area and non-display area on the substrates. For that reason, it is difficult to control the heights of the columnar spacers to their best value(s) (e.g., equalize their heights with each other) in both the display area and non-display area.

Japanese Patent Application Laid-Open Publication No. 2001-51266 discloses a technique for forming a multilayer structure of a black matrix and color filters in a non-display area and arranging columnar spacers on the multilayer structure. According to this technique, by adjusting the number of layers included in the multilayer structure, the height of the columnar spacers arranged in the non-display area can be controlled. Thus, the columnar spacers can have their height controlled differently in the display area and in the non-display area.

However, if the color filters 73 and 74 of mutually different thicknesses were used as disclosed in Japanese Patent Application Laid-Open Publication No. 2003-84289, then the liquid crystal layer would have a different thickness in some picture elements than in other picture elements. In that case, the magnitudes of retardation caused by the liquid crystal layer on light would be different in these two groups of picture elements. As a result, unwanted coloring would be produced and the display quality would decrease in a black display mode or in a grayscale display mode.

On the other hand, according to the technique disclosed in Japanese Patent Application Laid-Open Publication No. 2001-51266, the heights of the columnar spacers are controlled by changing the numbers of layers in the multilayer structure. However, this technique just allows the designer to change the heights of the columnar spacers by no less than the thickness of any of the layers included in the multilayer structure. That is why the heights of the columnar spacers can be changed only discontinuously.

In sum, a sufficiently effective technique for controlling the heights of columnar spacers arbitrarily by a simple process has not been developed or discovered yet.

SUMMARY OF THE INVENTION

In order to overcome the problems described above, the present invention provides a color filter substrate in which the heights of columnar spacers can be arbitrarily controlled by a simple manufacturing process, and a liquid crystal display device including such a color filter substrate.

A color filter substrate according to a preferred embodiment of the present invention is a color filter substrate for a liquid crystal display device. The color filter substrate includes: a transparent substrate; a light-shield layer and a color filter layer, which are provided on the transparent substrate; a plurality of columnar spacers sticking out of the transparent substrate; and a protrusion to control the orientation of liquid crystal molecules. The color filter layer includes first, second and third color filters that transmit light rays in mutually different colors. The columnar spacers include first and second types of columnar spacers with mutually different heights. Each columnar spacer of the first type includes a first lower structure, including at least one layer that is made of the same film as at least one of the first, second and third color filters and the light-shield layer, and a first upper structure, including a layer that is made of the same film as the protrusion. Each columnar spacer of the second type includes a second lower structure, including at least one layer that is made of the same film as at least one of the first, second and third color filters and the light-shield layer, and a second upper structure, including a layer that is made of a resin.

In one preferred embodiment, the first type of columnar spacers are taller than the second type of columnar spacers.

In one preferred embodiment, the second type of columnar spacers are taller than the first type of columnar spacers.

In one preferred embodiment, the shorter one of the two types of columnar spacers are arranged at a higher density than the other taller type of columnar spacers.

In one preferred embodiment, the first upper structure further includes a layer made of the resin.

In one preferred embodiment, the second upper structure includes no layers that are made of the same film as the protrusion.

In one preferred embodiment, the color filter substrate of the present invention further includes a structure that is made of the same film as the protrusion in the vicinity of the second type of columnar spacers.

In one preferred embodiment, the resin is a photosensitive resin.

In one preferred embodiment, the resin is a negative photosensitive resin, and the protrusion is made of a positive photosensitive resin.

A liquid crystal display device according to a preferred embodiment of the present invention includes a color filter substrate having the configuration described above, an active-matrix substrate, which is arranged so as to face the color filter substrate, and a liquid crystal layer, which is interposed between the color filter substrate and the active-matrix substrate.

In one preferred embodiment, the active-matrix substrate includes a plurality of switching elements that are arranged in matrix and a plurality of picture element electrodes, each of which is electrically connected to an associated one of the switching elements. The columnar spacers are arranged so as not to overlap with the picture element electrodes.

In one preferred embodiment, the active-matrix substrate further includes a gap adjusting layer, which is selectively arranged so as to face the shorter one of the two types of columnar spacers and adjust the gap between those shorter columnar spacers and the surface of the active-matrix substrate.

In one preferred embodiment, the active-matrix substrate further includes a plurality of gate lines and a plurality of source lines that intersects with the gate lines, and the gap adjusting layer is made of the same film as either the gate lines or the source lines.

In one preferred embodiment, the active-matrix substrate includes a plurality of thin-film transistors, and the gap adjusting layer is made of the same semiconductor layer as the one included in each thin-film transistor.

Another liquid crystal display device according to a further preferred embodiment of the present invention includes: an active-matrix substrate including a plurality of switching elements that are arranged in matrix; a color filter substrate, which is arranged so as to face the active-matrix substrate; and a liquid crystal layer, which is interposed between the active-matrix substrate and the color filter substrate. The color filter substrate includes: a transparent substrate; a color filter layer, which is arranged on the transparent substrate; and a plurality of columnar spacers sticking out of the transparent substrate. The columnar spacers include first and second types of columnar spacers with mutually different heights. The active-matrix substrate further includes a gap adjusting layer, which is selectively arranged so as to face the shorter one of the two types of columnar spacers and adjust the gap between those shorter columnar spacers and the surface of the active-matrix substrate.

In one preferred embodiment, the active-matrix substrate further includes a plurality of gate lines and a plurality of source lines that intersects with the gate lines, and the gap adjusting layer is made of the same film as either the gate lines or the source lines.

In one preferred embodiment, the switching elements are thin-film transistors, and the gap adjusting layer is made of the same semiconductor layer as the one included in each thin-film transistor.

Various preferred embodiments of the present invention provide a color filter substrate that can arbitrarily control the heights of columnar spacers by a simple manufacturing process and a liquid crystal display device including such a color filter substrate. According to various preferred embodiments of the present invention, the aperture ratio would not decrease unnecessarily. Also, according to preferred embodiments of the present invention, when display panels of the same type are mass-produced, the material of the color filters can be selected more freely and the productivity can be increased and stabilized.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

In Japanese Patent Application No. 2005-171390, the present inventors proposed a method for controlling the heights of columnar spacers to be formed on an "undercoat layer" by interposing the undercoat layer, which is made of the same film as a black matrix or color filters, between the columnar spacers and the substrate and by changing the areas and shapes of the undercoat layer. This method takes advantage of the phenomenon that the height of the columnar spacers made of a resin depends on the area and shape of the undercoat layer. For example, the greater the area of the undercoat layer, the higher the columnar spacers. Conversely, the smaller the area of the undercoat layer, the lower the columnar spacers. For that reason, if two types of undercoat layers having a relatively large area and a relatively small area, respectively, are arranged on the substrate and then columnar spacers are formed thereon, two types of columnar spacers with mutually different heights can be made easily on the substrate.

If this technique is adopted, however, columnar spacers with a desired height cannot be made without being restricted by the area or shape of the undercoat layer. For example, to increase the height of the columnar spacers sufficiently, the undercoat layer should have a sufficiently large area, which would decrease the aperture ratio.

Thus, the present invention was made to overcome not just the problems with the two prior art documents described above but also such a problem with Japanese Patent Application No. 2005-171390. Hereinafter, preferred embodiments of the present invention will be described with reference to the accompanying drawings. In the following description, preferred embodiments of the present invention will be described as preferably being applied to a color filter substrate for an active-matrix-addressed LCD and its manufacturing process. However, the present invention is in no way limited to the specific preferred embodiments to be described below.

Preferred Embodiment 1

Figure 1:
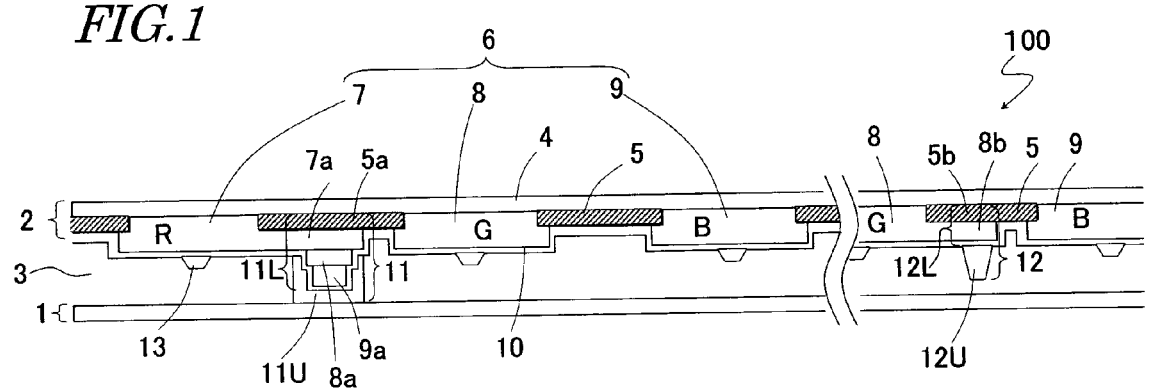
FIG. 1 is a cross-sectional view schematically illustrating a liquid crystal display device according to a preferred embodiment of the present invention.

First, with reference to FIG. 1, the structure of a liquid crystal display device 100 of this preferred embodiment will be described. FIG. 1 is a cross-sectional view schematically illustrating the liquid crystal display device 100, which is a so-called multi-domain vertical alignment (MVA) LCD.

The liquid crystal display device 100 includes an active-matrix substrate 1, a color filter substrate 2 that faces the active-matrix substrate 1, and a liquid crystal layer 3 interposed between the two substrates 1 and 2. The active-matrix substrate 1 may be a known one, and therefore, its structure will not be described herein.

The liquid crystal layer 3 is a vertical alignment liquid crystal layer and typically includes a liquid crystal material with negative dielectric anisotropy. And when no voltage is applied thereto, the liquid crystal molecules in the liquid crystal layer 3 are aligned perpendicularly relative to the surface of the substrates by vertical alignment films (not shown in FIG. 1). The vertical alignment films are arranged on the surface of the active-matrix substrate 1 and on that of the color filter substrate 2 so as to contact with the liquid crystal layer 3.

The color filter substrate 2 includes a transparent substrate (e.g., a glass substrate) 4, a light-shield layer 5 and a color filter layer 6 that are provided on the substrate 4, and a plurality of columnar spacers 11 and 12 sticking out of the substrate 4. The color filter substrate 2 further includes protrusions (ribs) 13 to control the orientation of the liquid crystal molecules. The surface shape of these protrusions 13 causes the liquid crystal molecules in the liquid crystal layer 3 to have a tilted orientation.

On the other hand, the picture element electrodes of the active-matrix substrate 1 have a slit (not shown), which generates an oblique electric field under an applied voltage, thus causing the liquid crystal molecules to have a tilted orientation. The protrusions 13 and slits are respectively arranged on the color filter substrate 2 and on the active-matrix substrate 1 so as to have their orientation-regulating forces matched with each other. When a voltage is applied thereto, the liquid crystal molecules in the liquid crystal layer 3 have their orientation controlled by the protrusions 13 and the slits. As a result, multiple liquid crystal domains in which the oriented liquid crystal molecules have mutually different azimuth angles are produced, thus enabling the liquid crystal display device 100 to conduct a display operation with a wide viewing angle.

The protrusions 13 and the slits may be arranged as in any of various known MVA LCDs (such as that disclosed in Japanese Patent Application Laid-Open Publication No. 11-242225). Optionally, instead of cutting slits through the picture element electrodes of the active-matrix substrate 1, additional protrusions (ribs) may be arranged on the picture element electrodes and the orientation of liquid crystal molecules may be controlled using the protrusions 13 on the color filter substrate 2 and those additional protrusions on the active-matrix substrate 1 in combination.

Hereinafter, the structure of the color filter substrate 2 will be described more specifically.

The light-shield layer 5 is formed in a lattice (or striped) pattern outside of the picture elements and is also called a "black matrix (BM)". The color filter layer 6 includes first, second and third color filters 7, 8 and 9, which transmit light rays in mutually different colors. In this preferred embodiment, the first color filter 7 is a red color filter, the second color filter 8 is a green color filter, and the third color filter 9 is a blue color filter. A common electrode 10 made of a transparent conductor (such as ITO) is provided so as to cover the light-shield layer 5 and the color filter layer 6.

The color filter substrate 2 of this preferred embodiment preferably has two types of columnar spacers 11 and 12 with mutually different heights.

The taller columnar spacers 11 (one of which is shown on the left-hand side of FIG. 1) include a lower structure 11L, which consists of the same films as the light-shield layer 5 and the red, green and blue color filters 7, 8, and 9, and an upper structure 11U including the same film as the protrusions 13 to control the orientation.

The lower structure 11L is a multilayer structure consisting of a layer 5a made of the same film as the light-shield layer 5, a layer 7a made of the same film as the red color filter 7, a layer 8a made of the same film as the green color filter 8, and a layer 9a made of the same film as the blue color filter 9. Since the light-shield layer 5 and the red, green and blue color filters 7, 8, 9 are made of a resin, the lower structure 11L is a stack structure of resin layers. On this lower structure 11L, arranged is the upper structure 11U. As the orientation controlling protrusions 13 are made of a resin in this preferred embodiment, the upper structure 11U is a structure which is made of a resin.

The shorter columnar spacers 12 (one of which is shown on the right-hand side of FIG. 1) include a lower structure 12L, consisting of the same films as the light-shield layer 5 and the green color filter 8, and an upper structure 12U, which is made of a resin but formed separately from the orientation controlling protrusions 13.

The lower structure 12L is a multilayer structure consisting of a layer 5b made of the same film as the light-shield layer 5 and a layer 8b made of the same film as the green color filter 8 and is a stack structure of resin layers. On this lower structure 12L, arranged is the upper structure 12U. In this preferred embodiment, the upper structure 12U is made of a photosensitive resin.

As described above, the columnar multilayer structure as a whole, having the function of defining the cell gap, will be referred to herein as a "columnar spacer". It should be noted that the columnar spacer could include not just those resin layers, which are made of the same films as the color filters, light-shield layer and orientation controlling protrusions, but also an inorganic layer (such as a portion of the common electrode of ITO as shown in FIG. 1). Also, if the light-shield layer is made of a metal, the columnar spacer may include a metal layer.

Hereinafter, it will be described what effects will be achieved by providing these two types of columnar spacers 11 and 12 with mutually different heights.

As shown in FIG. 1, the taller columnar spacer 11 is in contact with the active-matrix substrate 1, but the shorter columnar spacer 12 is out of contact with the active-matrix substrate 1. That is to say, in this state, the cell gap is defined only by the taller columnar spacers 11.

Figure 2:
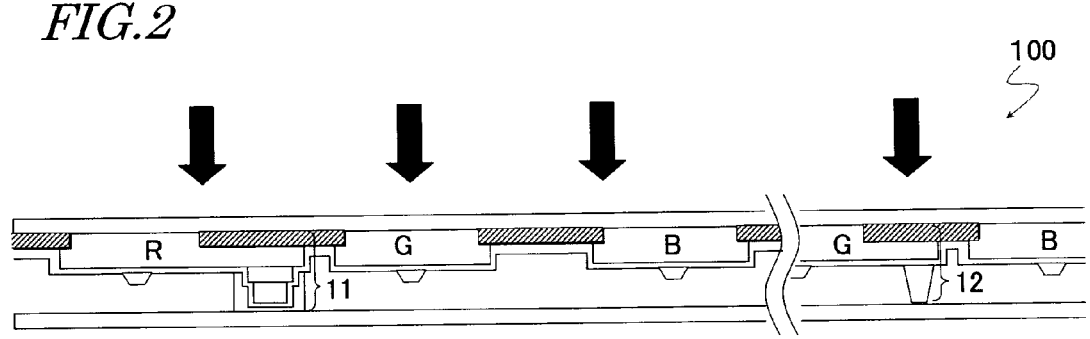
FIG. 2 is a view schematically illustrating how the liquid crystal display device changes when load is placed thereon.

In the conventional liquid crystal display device, if the columnar spacers were arranged at a higher density (i.e., if the number of columnar spacers per unit area were increased) to enhance the withstand load, then low-temperature bubbling would be produced more frequently. On the other hand, in this liquid crystal display device 100, the cell gap is controlled basically with only the taller columnar spacers 11 as shown in FIG. 1, and therefore, the effective spacer density is defined by only those taller columnar spacers 11. That is why the cell gap can catch up with the shrinkage of the liquid crystal layer 3 more easily and the low-temperature bubbling phenomenon can be avoided. In addition, if the cell gap narrows with load placed on the liquid crystal display device 100, then the two substrates will be supported by both of the taller and shorter columnar spacers 11 and 12 as shown in FIG. 2. In that case, the effective spacer density is defined by both of the two types of columnar spacers 11 and 12. As a result, high withstand load is realized. In the following description, the taller columnar spacers 11 will also be referred to herein as "main spacers" and the shorter columnar spacers 12 as "sub-spacers".

The height of the main spacers 11 is controlled by adjusting the number of layers that form the lower structure 11L and the thickness of the upper structure 11U. On the other hand, the height of the sub-spacers 12 is controlled by adjusting the number of layers that form the lower structure 12L and the thickness of the upper structure 12U.

The upper structure 11U of the main spacer 11 is made of the same film as the orientation controlling protrusions 13. On the other hand, the upper structure 12U of the sub-spacer 12 is made of a resin but formed separately from the upper structure 11U of the main spacer 11 or the protrusions 13. That is why in this liquid crystal display device 100, by adjusting the thicknesses of the respective upper structures 11U and 12U of the main and sub-spacers 11 and 12, the heights of the main and sub-spacers 11 and 12 can be defined to be any arbitrary values independently of each other.

According to the method disclosed in Japanese Patent Application No. 2005-171390, to increase the height of the columnar spacers sufficiently, the area of the undercoat layer (corresponding to either the lower structure or some layer(s) included in the lower structure according to a preferred embodiment of the present invention) needs to be increased. However, preferred embodiments of the present invention are totally free from such constraints. That is to say, the heights of the columnar spacers 11 and 12 can be controlled without depending on the area of the respective layers that form the lower structure 11L or 12L. Consequently, even if the sub-spacers 12 were arranged at a higher density to increase the withstand load, the aperture ratio would not decrease for that reason.

In this preferred embodiment, the lower structure 11L of the main spacer 11 has a four-layer structure and the lower structure 12L of the sub-spacer 12 has a two-layer structure. However, the number of layers included in the lower structure 11L or 12L does not have to be four or two. Rather, the number of layers included in the lower structure 11L of the main spacer 11 may be different from, or the same as, that of layers included in the lower structure 12L of the sub-spacer 12.

According to preferred embodiments of the present invention, the upper structure 11U of the main spacer 11 and the upper structure 12U of the sub-spacer 12 are preferably made of two different films. However, because the upper structure 11U of the main spacer 11 is preferably made of the same film as the orientation controlling protrusion 13, there is no need to increase the number of manufacturing process steps even if the present invention is adopted. To exert the expected orientation-regulating force effectively, the orientation controlling protrusion 13 preferably has a height of about 0.7 µm to about 1.8 µm, for example.

The heights and elastic properties of the columnar spacers 11 and 12 are preferably defined such that even when the temperature changes from an ordinary temperature (of about 23° C., for example) into a low temperature (of about −20° C., for example), the variation in the cell gap becomes smaller than the difference in height between the main and sub-spacers 11 and 12. By adopting such settings, while no load is placed on the liquid crystal display device 100, the cell gap is defined only by the main spacers 11. That is why by merely adjusting the density of the main spacers 11, the cell gap can catch up with the shrinkage of the liquid crystal layer 3 and the low-temperature bubbling can be minimized. Also, if the cell gap narrows with the pressure applied by fingers on the liquid crystal display device 100, the two substrates are supported by both of the main spacers 11 and the sub-spacers 12 as shown in FIG. 2. As a result, high withstand load is realized.

To make the cell gap catch up with the shrinkage of the liquid crystal layer 3 and to sufficiently withstand the load placed, the main spacers 11 may be arranged at a density of about 0.03% to about 0.07%, for example, and the sub-spacers 12 may be arranged at a density of about 0.1% to about 0.6%, for example. The densities of the columnar spacers arranged are preferably calculated as follows. Specifically, the density of main spacers 11 may be defined as [(contact area between single columnar spacer and active-matrix substrate×number of spacers)/overall area of color filter substrate]×100 (%). On the other hand, the density of sub-spacers 12 may be defined as [(contact area between single columnar spacer and active-matrix substrate under pressure×number of spacers)/overall area of color filter substrate]×100 (%).

Hereinafter, a method for fabricating the liquid crystal display device 100 will be described. As the active-matrix substrate 1 may be fabricated by a known manufacturing process, a method of making the color filter substrate 2 will be described with reference to FIGS. 3A through 3G.

Figure 3A:
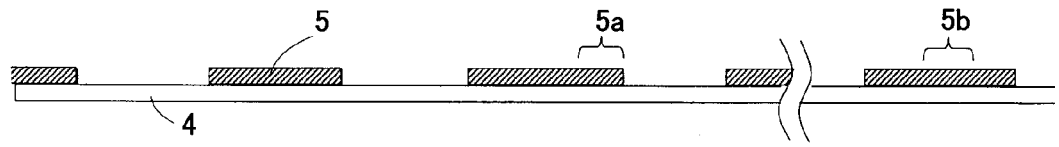
FIGS. 3A-3G are cross-sectional views schematically illustrating respective process steps for making the color filter substrate of the liquid crystal display device.

First, as shown in FIG. 3A, a light-shield layer 5 is formed on a substrate 4. Specifically, the substrate 4 is coated with a negative photosensitive resin, in which a black pigment is dispersed, using a slit coater, the coating is dried, and then the photosensitive resin film thus obtained is exposed to radiation and developed, thereby forming the light-shield layer 5. In this process step, layers 5a and 5b to be the lowermost layers of the lower structures 11L and 12L are formed at the same time.

Figure 3B:
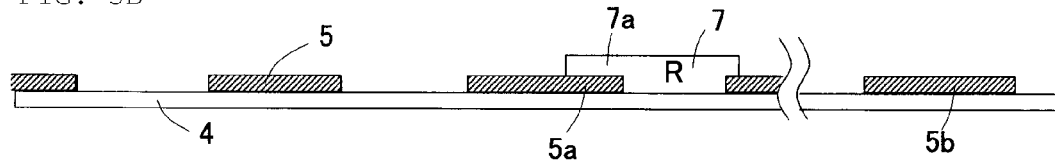

Next, as shown in FIG. 3B, red color filters 7 are formed. Specifically, the substrate 4 is coated with a negative photosensitive resin, in which a red pigment is dispersed, using a slit coater, the coating is dried, and then the photosensitive resin film thus obtained is exposed to radiation and developed, thereby forming the red color filters 7. In this process step, a layer 7a to be the second layer of the lower structure 11L of the main spacers 11 is also formed on the layer 5a that is made of the same film as the light-shield layer 5.

Figure 3C:
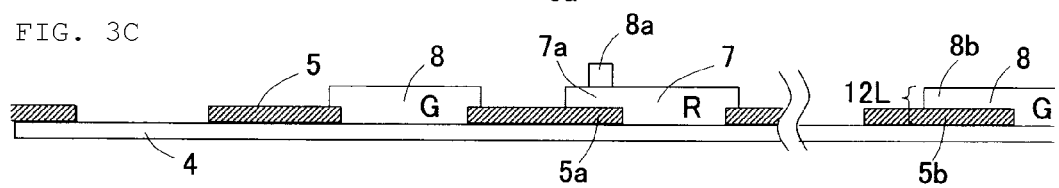

Subsequently, as shown in FIG. 3C, green color filters 8 are formed. Specifically, using a negative photosensitive resin in which a green pigment is dispersed, the green color filters 8 are formed in the same way as the red color filters 7. In this process step, a layer 8a to be the third layer of the lower structure 11L of the main spacers 11 is also formed on the layer 7a that is made of the same film as the red color filters 7. In addition, a layer 8b to be the second layer of the lower structure 12L of the sub-spacers 12 is also formed on the layer 5b that is made of the same film as the light-shield layer 5, thereby completing the lower structure 12L consisting of the two layers 5b and 8b.

Figure 3D:
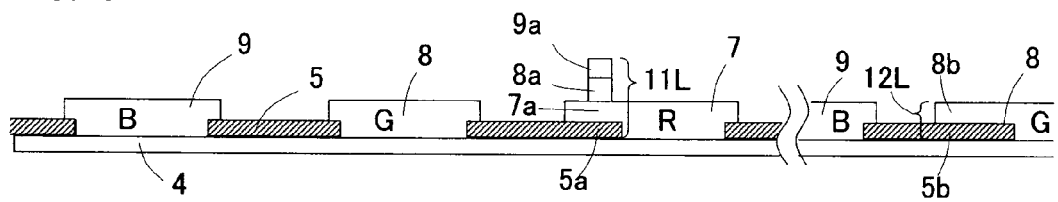

Thereafter, as shown in FIG. 3D, blue color filters 9 are formed. Specifically, using a negative photosensitive resin in which a blue pigment is dispersed, the blue color filters 9 are formed in the same way as the green color filters 8. In this process step, a layer 9a to be the fourth layer of the lower structure 11L of the main spacers 11 is also formed on the layer 8a that is made of the same film as the green color filters 8, thereby completing the lower structure 11L consisting of the four layers 5a, 7a, 8a and 9a.

Figure 3E:
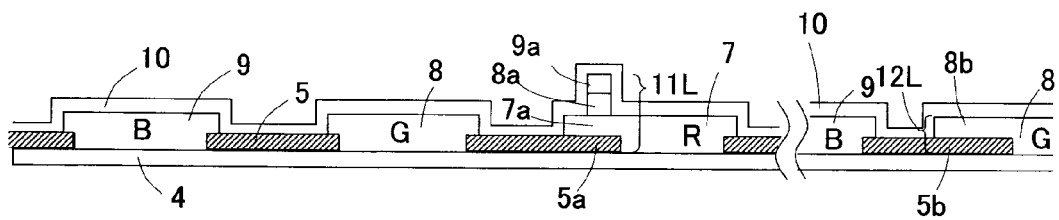

Next, as shown in FIG. 3E, a common electrode 10 is formed. The common electrode 10 is formed by a sputtering process or any other process using a transparent conducting material (e.g., ITO).

Figure 3F:
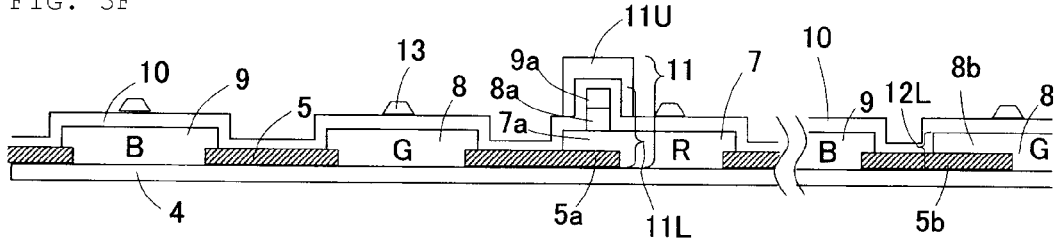

Thereafter, as shown in FIG. 3F, orientation controlling protrusions (ribs) 13 are formed on the common electrode 10. Specifically, the common electrode 10 is coated with a photosensitive resin (such as a phenol novolac based positive photosensitive resin), using a slit coater, the coating is dried, and then the photosensitive resin film thus obtained is exposed to radiation and developed, thereby forming the protrusions 13. In this process step, the upper structure 11U is also formed on the lower structure 11L, thereby completing the main spacers 11.

Figure 3G:
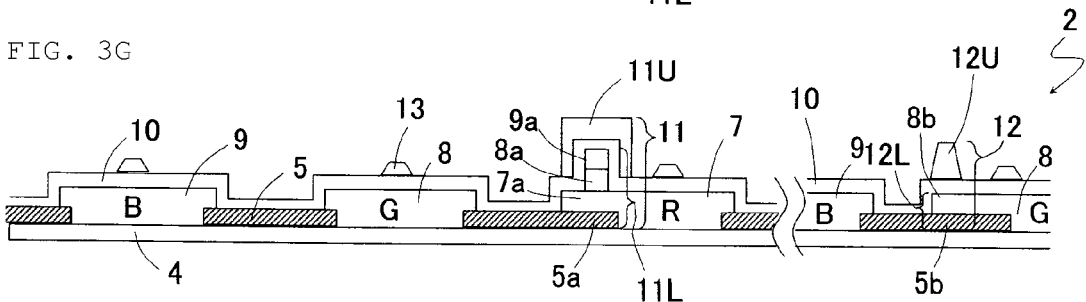

Subsequently, as shown in FIG. 3G, an upper structure 12U of a resin is formed on the lower structure 12L. Specifically, the lower structure 12L is coated with a photosensitive resin (such as an acrylic based negative photosensitive resin), using a slit coater, the coating is dried, and then the photosensitive resin film thus obtained is exposed to radiation and developed, thereby forming the upper structure 12U. As a result, the sub-spacers 12 are completed.

Hereinafter, the effects of preferred embodiments of the present invention will be described more specifically with reference to the following Table 1, which shows data that were collected about respective columnar spacers in an example in which the heights of the columnar spacers were controlled by the method of the present invention (Example #1) and in examples in which the heights of the columnar spacers were controlled by other methods (Comparative Examples #1, #2 and #3). As shown in Table 1, the color filter substrate was fabricated such that in Example #1 and Comparative Examples #1, #2 and #3, each of the light-shield layer, the red, green and blue color filters and the orientation controlling protrusions would have the same thickness as its counterparts (which are shown as "normal portion thicknesses" in Table 1).

TABLE 1

|  |  | Main spacer | Sub-spacer | | | |
|---|---|---|---|---|---|---|
|  |  | Common | Ex. 1 | Cmp. Ex. 1 | Cmp. Ex. 2 | Cmp. Ex. 3 |
| Normal portion thickness | BM | 1.45 μm | ← | ← | ← | ← |
|  | RED | 1.70 μm | ← | ← | ← | ← |
|  | GREEN | 1.70 μm | ← | ← | ← | ← |
|  | BLUE | 1.70 μm | ← | ← | ← | ← |
|  | Orientation controlling protrusion | 1.20 μm | ← | ← | ← | ← |
| Sizes of layers that form spacers | BM | 44 μm□ | 44 μm□ | 44 μm□ | 44 μm × 101 μm | 44 μm□ |
|  | RED | cover BM fully | cover BM fully | cover BM fully | cover BM fully | cover BM fully |
|  | GREEN | 30 μmφ | — | 17 μmφ | 17 μm × 87 μm | 30 μmφ |
|  | BLUE | 16 μmφ | — | 10 μmφ | 10 μm × 73 μm | none |
|  | Photosensitive resin layer | none | 30 μmφ | none | none | none |
|  | Orientation controlling protrusion layer | 44 μmφ | — | 44 μmφ | 10 μm × 101 μm | 44 μmφ |
| Spacer height |  | 3.50 μm | 3.10 μm | 3.10 μm | 3.10 μm | 2.85 μm |
| Spacer size |  | 16 μmφ | 30 μmφ | 10 μmφ | 10 μm × 73 μm | 30 μmφ |
| Decrease in CF aperture area |  | — | None | None | ▲2508 μm² | None |
| Relative area of spacers |  | 1.00 | 3.52 | 0.39 | 3.52 | 3.52 |
| Withstand load |  | — | ○ | X | ○ | X |
| Note |  |  |  | Sub-spacer density decreased | Aperture ratio decreased | Sub-spacer height decreased |

Thereafter, the color filter substrate 2 thus obtained and an active-matrix substrate 1 that has been provided separately are bonded together with a seal member applied to the outer periphery of one of these two substrates surrounding the display area thereof. Before they are bonded together, alignment films are formed on the respective surfaces of the color filter substrate 2 and the active-matrix substrate 1. And then a liquid crystal material is injected into the gap between the two substrates and the sealing is performed, thereby completing a liquid crystal display device 100. Alternatively, the liquid crystal layer 3 may be formed on the substrate with the seal member by a one-drop fill method, and then the two substrates may be bonded together.

It should be noted that the columnar spacers 11 and 12 are preferably arranged so as not to overlap with any of the picture element electrodes on the active-matrix substrate 1. By adopting such an arrangement, it is possible to prevent the common electrode 10, located under the columnar spacers 11 and 12, from being electrically short-circuited with the picture element electrodes, thus increasing the electrical reliability of the display device.

Figure 4A:
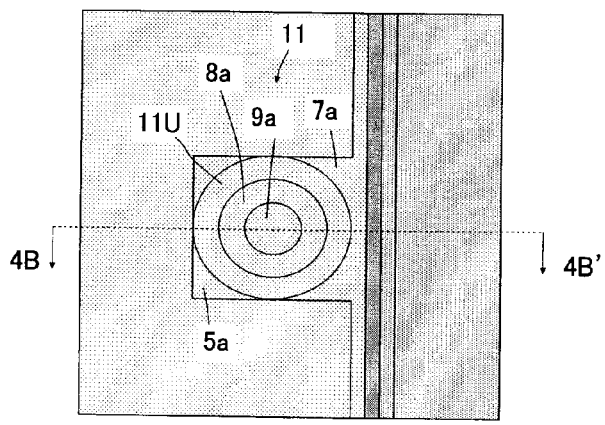
FIGS. 4A and 4B are respectively a top view, and a cross-sectional view as viewed along the plane 4B-4B' shown in FIG. 4B, schematically illustrating a main spacer according to Example #1.
Figure 4B:
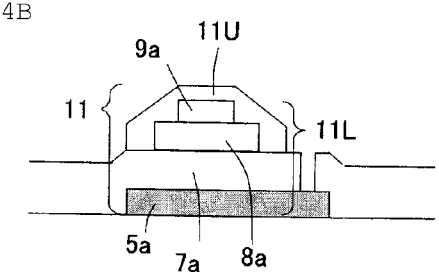

As shown in FIGS. 4A and 4B, each of the main spacers 11 of Example #1 has a lower structure 11L including the layers 5a, 7a, 8a and 9a, which are made of the same films as the light-shield layer 5 and the red, green and blue color filters 7, 8, 9, respectively, and an upper structure 11U made of the same film as the orientation controlling protrusion 13. The lowermost layer 5a that is made of the same film as the light-shield layer 5 has an approximately 44 μm square shape (which is represented by the open square □ in Table 1), for example. The second layer 7a that is made of the same film as the red color filters 7 is arranged so as to cover the lowermost layer 5a fully (which is represented by "fully" in Table 1). The third layer 8a that is made of the same film as the green color filters 8 has a circular shape with a diameter of about 30 μm (which is represented by φ in Table 1), for example. The fourth layer 9a that is made of the same film as the blue color filters 9 has a circular shape with a diameter of about 16 μm, for example. And the upper structure 11U that is made of the same film as the orientation controlling protrusions 13 (which is called "orientation controlling protrusion layer" in Table 1) has a circular shape with a diameter of about 44 μm, for example.

Figure 5A:
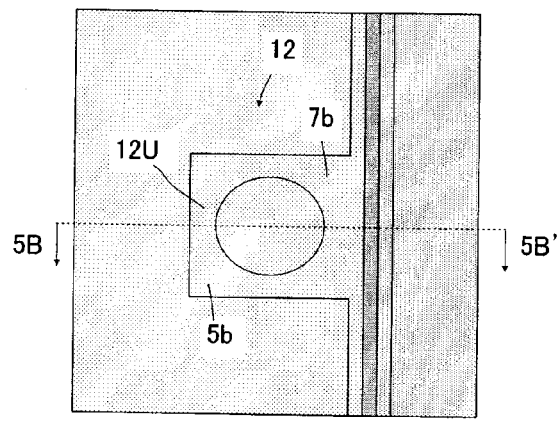
FIGS. 5A and 5B are respectively a top view, and a cross-sectional view as viewed along the plane 5B-5B' shown in FIG. 5A, schematically illustrating a sub-spacer according to Example #1.
Figure 5B:
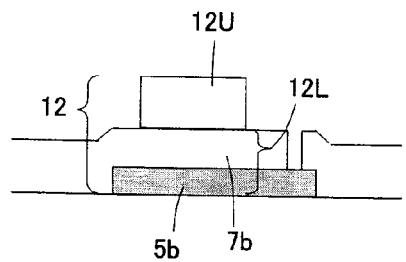

On the other hand, each of the sub-spacers 12 of Example #1 has a lower structure 12L including the layers 5b and 7b, which are made of the same films as the light-shield layer 5 and the red color filters 7, respectively, and an upper structure 12U made of a photosensitive resin as shown in FIGS. 5A and 5B. The lowermost layer 5b that is made of the same film as the light-shield layer 5 preferably has an approximately 44 μm square shape, for example. The second layer 7b that is made of the same film as the red color filters 7 is arranged so as to cover the lowermost layer 5b entirely. And the upper structure 12U that is made of a photosensitive resin (which is called "photosensitive resin layer" in Table 1) has a circular shape with a diameter of about 30 μm, for example.

In Example #1, the main spacers 11 had a height of about 3.5 μm (as measured from a reference plane) and an effective size (diameter) of about 16 μm as measured in the in-plane direction on the substrate. In the following description, every numerical value will mean a height as measured from the upper surface of a layer that is made of the same film as the red color filters 7 unless stated otherwise. On the other hand, the sub-spacers 12 had a height of about 3.1 μm and an effective size (diameter) of about 30 μm. According to this Example #1, the main and sub-spacers 11 and 12 were both formed to have desired heights but there was no excessive decrease in numerical aperture. In addition, since the sub-spacers 12 had a sufficiently large relative area of about 3.52 (which is an area with respect to the area of the main spacers 11 as unity), sufficiently high withstand load was realized.

Figure 6:
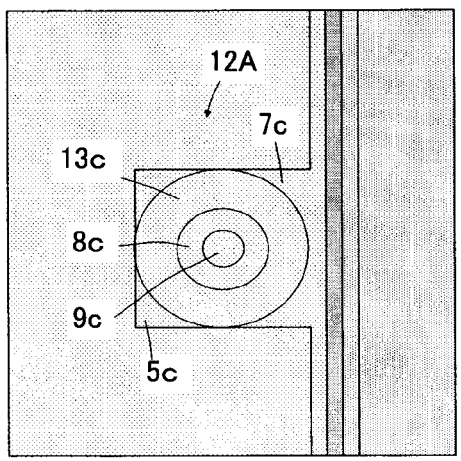
FIG. 6 is a top view schematically illustrating a sub-spacer according to Comparative Example #1.

The main spacers of Comparative Example #1 have the same structure as the main spacers 11 of Example #1. However, the sub-spacers 12A of Comparative Example #1 include layers 5c, 7c, 8c and 9c that are made of the same films as the light-shield layer and the red, green and blue color filters and another layer 13c that is made of the same film as the orientation controlling protrusions as shown in FIG. 6. That is to say, according to Comparative Example #1, the sub-spacers 12A have the same multilayer structure as the main spacers. Nevertheless, the third and fourth layers 8c and 9c of the sub-spacers 12A have a circular shape with diameters of 17 μm and 10 μm, respectively, which are smaller than the third and fourth layers of the main spacers as shown in Table 1. In other words, according to Comparative Example #1, by changing the areas of the underlying layers 8c and 9c, the height of the layer 13c formed thereon is decreased just like the technique disclosed in Japanese Patent Application No. 2005-171390.

According to Comparative Example #1, since the areas of the underlying layers 8c and 9c were decreased, the effective size (diameter) of the sub-spacers 12A decreased to 10 μm and the relative area of the sub-spacers 12A also decreased to 0.39. As a result, the density of the sub-spacers 12A arranged decreased, and sufficiently high withstand load could not be realized.

Figure 7:
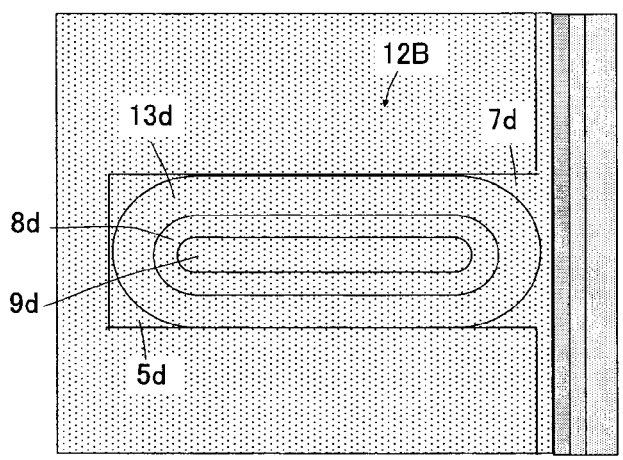
FIG. 7 is a top view schematically illustrating a sub-spacer according to Comparative Example #2.

The main spacers of Comparative Example #2 have the same structure as the main spacers 11 of Example #1. However, the sub-spacers 12B of Comparative Example #2 include layers 5d, 7d, 8d and 9d that are made of the same films as the light-shield layer and the red, green and blue color filters and another layer 13d that is made of the same film as the orientation controlling protrusions as shown in FIG. 7. That is to say, according to Comparative Example #2, the sub-spacers 12B have the same multilayer structure as the main spacers. Nevertheless, these layers 5d, 7d, 8d, 9d and 13d of the sub-spacers 12B have a horizontally elongated shape compared to the layers 5c, 7c, 8c, 9c and 13c that form the sub-spacers 12A in Comparative Example #1 as shown in Table 1. This is done in order to increase the two-dimensional sizes of the sub-spacers 12B without changing the height of the sub-spacers 12B. According to Comparative Example #2, the sub-spacers 12B could have such a large size that sufficiently high withstand load was realized. However, as the sizes of the layers 5c, 7c, 8c, 9c and 13c were increased, the aperture area of the color filters decreased by 2,508 μm$^2$ and the aperture ratio dropped.

Figure 8:
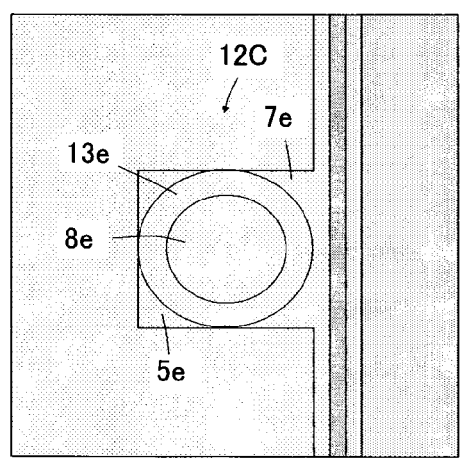
FIG. 8 is a top view schematically illustrating a sub-spacer according to Comparative Example #3.

The main spacers of Comparative Example #3 have the same structure as the main spacers 11 of Example #1. However, the sub-spacers 12C of Comparative Example #3 include layers 5e, 7e, 8e that are made of the same films as the light-shield layer and the red and green color filters and another layer 13e that is made of the same film as the orientation controlling protrusions as shown in FIG. 8. That is to say, according to Comparative Example #3, the number of layers stacked in the sub-spacers 12C is smaller by one than that of the main spacers. This is done in order to make the sub-spacers 12C less tall than the main spacers by omitting the layer that is made of the same film as the blue color filters from the sub-spacers 12C. In that case, however, the sub-spacers 12C had too low a height of 2.85 μm to realize sufficiently high withstand load.

Preferred Embodiment 2

Figure 9:
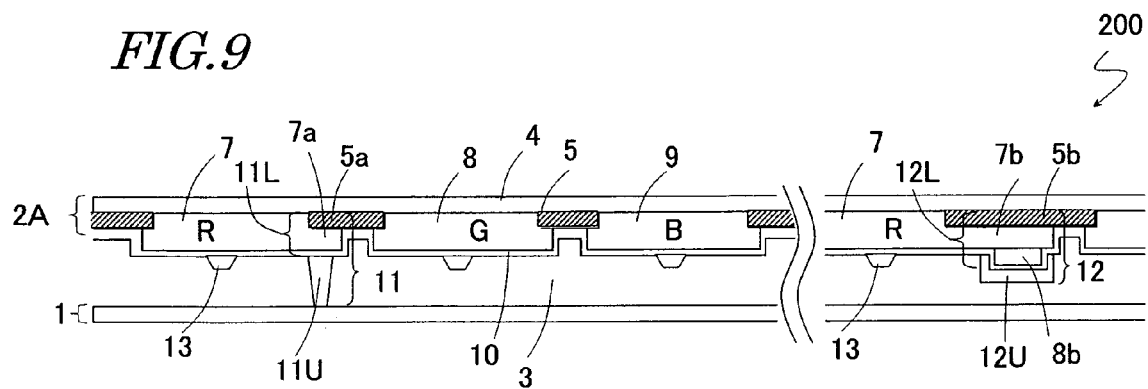
FIG. 9 is a cross-sectional view schematically illustrating a liquid crystal display device according to another preferred embodiment of the present invention.

Hereinafter, the structure of a liquid crystal display device 200 of this preferred embodiment will be described with reference to FIG. 9, which is a cross-sectional view schematically illustrating the liquid crystal display device 200. The following description will be focused on the differences between the liquid crystal display device 200 and the liquid crystal display device 100 of Preferred Embodiment 1.

The color filter substrate 2A of this liquid crystal display device 200 is different from the color filter substrate 2 of the liquid crystal display device 100 described above in the multilayer structures of the main and sub-spacers 11 and 12.

The main spacers 11 of this preferred embodiment include a lower structure 11L, including a layer 5a, which is made of the same film as the light-shield layer 5, and a layer 7a, which is made of the same film as the red color filters 7, and an upper structure 11U, which has been made of a resin separately from the orientation controlling protrusions 13.

On the other hand, the sub-spacers 12 of this preferred embodiment include a lower structure 12L, including a layer 5b, which is made of the same film as the light-shield layer 5, and layers 7b and 8b, which are made of the same films as the red and green color filters 7 and 8, respectively, and an upper structure 12U, which is made of the same film as the orientation controlling protrusions 13.

In the liquid crystal display device 100 of Preferred Embodiment 1, the upper structure 11U of the main spacers 11 is made of the same film as the orientation controlling protrusions 13, and the upper structure 12U of the sub-spacers 12 is made of a resin separately from the protrusions 13. On the other hand, according to this preferred embodiment, the upper structure 11U of the main spacers 11 is made of a resin separately from the orientation controlling protrusions 13 and the upper structure 12U of the sub-spacers 12 is made of the same film as the orientation controlling protrusions 13 as described above. Even by adopting such multilayer structures, the heights of the columnar spacers 11 and 12 can also be controlled arbitrarily by as simple a manufacturing process as in the liquid crystal display device 100 of Preferred Embodiment 1.

In addition, according to a preferred embodiment of the present invention, the materials of color filters can be selected more freely in making a color filter substrate. In the prior art, it is difficult to use different color filter materials to mass-produce display panels of the same type. For example, a color filter material produced by a company (which will be referred to herein as "Color Material A") and a color filter material produced by another company (which will be referred to herein as "Color Material B") have mutually different coating film thicknesses to realize the same color purity. That is why if the heights of columnar spacers need to be controlled by the technique disclosed in Japanese Patent Application No. 2005-171390, for example, the heights of the columnar spacers should be equalized with each other by changing the areas of the underlying layers between a lot using Color Material A and a lot using Color Material B. However, if the areas of the underlying layers were changed between the lots, then the color filters would have different aperture areas between the lots and the respective picture elements would have different transmittances. Consequently, if different color materials were used, then the display quality would vary, which is a problem.

On the other hand, according to a preferred embodiment of the present invention, by controlling the thickness of the upper structure 11U of the main spacers 11 and that of the upper structure 12U of the sub-spacers independently of each other, the heights of the columnar spacers 11 and 12 can be equalized with each other even without changing the aperture areas of the color filters between lots that use mutually different color materials. Consequently, such a variation in display quality can be avoided. For that reason, when display panels of the same type are mass-produced, different color filter materials can be used, and therefore, the color filter materials can be selected more freely. As a result, the production can be stabilized.

Hereinafter, the effects of various preferred embodiments of the present invention will be described more specifically with reference to the following Table 2, which shows data that were collected about columnar spacers in Example #2 in which the heights of the columnar spacers were controlled by the multilayer structures of this embodiment and in Comparative Examples #4 and #5 in which the heights of the columnar spacers were controlled by other methods. The data about Example 1 shown in Table 1 is also shown in Table 2. Examples #1 and #2 used mutually different color filter materials. In Table 2, the color filter material for Example #1 is identified by Color material A and the color filter material for Example #2 by Color Material B, respectively.

TABLE 2

|  |  | Example #1 Color material A | | Example #2 Color material B | |
| --- | --- | --- | --- | --- | --- |
|  |  | Main spacer | Sub-spacer | Main spacer | Sub-spacer |
| Normal portion thickness | BM | 1.45 μm | | 1.35 μm | |
|  | RED | 1.70 μm | | 2.20 μm | |
|  | GREEN | 1.70 μm | | 2.20 μm | |
|  | BLUE | 1.70 μm | | 2.20 μm | |
|  | Orientation controlling protrusion | 1.20 μm | | ← | |
| Sizes of layers that form spacers | BM | 44 μm□ | 44 μm□ | 44 μm□ | 44 μm□ |
|  | RED | cover BM fully | cover BM fully | cover BM fully | cover BM fully |
|  | GREEN | 30 μmφ | none | none | 30 μmφ |
|  | BLUE | 16 μmφ | none | none | none |
|  | Photosensitive resin layer | none | 30 μmφ | 16 μmφ | none |
|  | Orientation controlling protrusion layer | 44 μmφ | none | none | 44 μmφ |
| Spacer height |  | 3.50 μm | 3.10 μm | 3.50 μm | 3.10 μm |
| Spacer size |  | 16 μmφ | 30 μmφ | 16 μmφ | 30 μmφ |
| Decrease in CF aperture area |  | none | | None | |
| Relative area of spacers |  | 1.00 | 3.52 | 1.00 | 3.52 |
| Withstand load |  | ○ | | ○ | |
| Note |  | Areas and heights of main and sub-spacers remained the same whether the color material used was A or B | | | |

|  |  | Comparative Example #4 Color material B | | Comparative Example #5 Color material B | |
| --- | --- | --- | --- | --- | --- |
|  |  | Main spacer | Sub-spacer | Main spacer | Sub-spacer |
| Normal portion thickness | BM | ← | | ← | |
|  | RED | ← | | ← | |
|  | GREEN | ← | | ← | |
|  | BLUE | ← | | ← | |
|  | Orientation controlling protrusion | ← | | ← | |
| Sizes of layers that form spacers | BM | 44 μm□ | 44 μm□ | 44 μm□ | 44 μm□ |
|  | RED | cover BM fully | cover BM fully | cover BM fully | cover BM fully |
|  | GREEN | 30 μmφ | 30 μmφ | 17 μmφ | 30 μmφ |
|  | BLUE | 16 μmφ | none | 10 μmφ | none |
|  | Photosensitive resin layer | none | none | none | none |

TABLE 2-continued

|  | | | | |
|---|---|---|---|---|
| Orientation controlling protrusion layer | 44 μmφ | 44 μmφ | 44 μmφ | 44 μmφ |
| Spacer height | 3.80 μm | 3.10 μm | 3.50 μm | 3.10 μm |
| Spacer size | 16 μmφ | 30 μmφ | 10 μmφ | 30 μmφ |
| Decrease in CF aperture area | none | | None | |
| Relative area of spacers | 1.00 | 3.52 | 0.39 | 3.52 |
| Withstand load |  | X | | Δ |
| Note | | Main spacer height increased | | Main spacers deformed plastically when pressed |

Figure 10A:
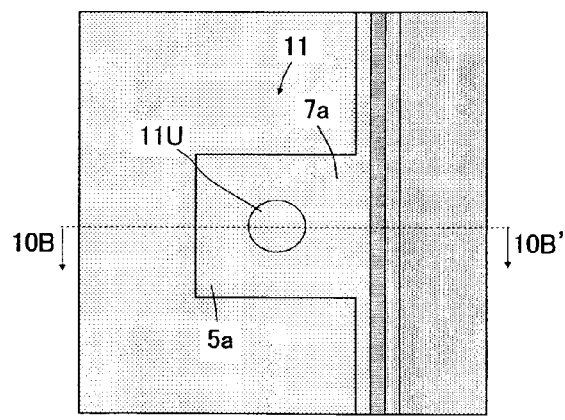
FIGS. 10A and 10B are respectively a top view, and a cross-sectional view as viewed along the plane 10B-10B' shown in FIG. 10A, schematically illustrating a main spacer according to Example #2.
Figure 10B:
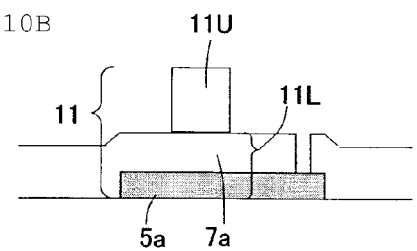

As shown in FIGS. 10A and 10B, the main spacers 11 of Example #2 have a lower structure 11L consisting of layers 5a and 7a that are made of the same films as the light-shield layer 5 and the red color filters 7, respectively, and an upper structure 11U made of a photosensitive resin.

Figure 11A:
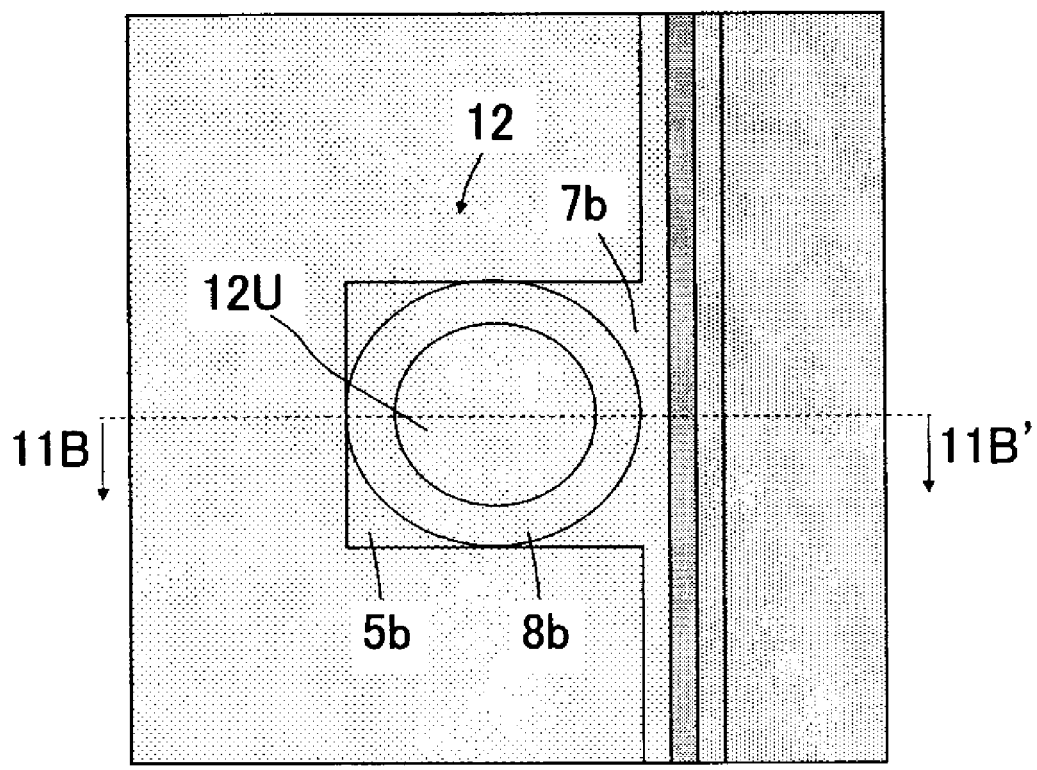
FIGS. 11A and 11B are respectively a top view, and a cross-sectional view as viewed along the plane 11B-11B' shown in FIG. 11A, schematically illustrating a sub-spacer according to Example #2.
Figure 11B:
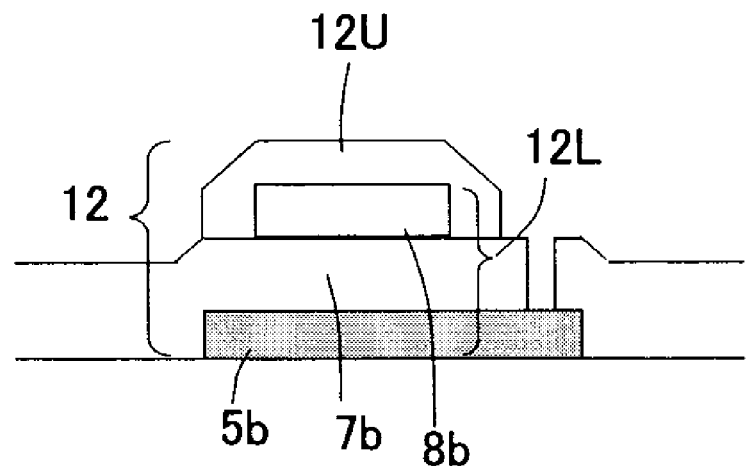

On the other hand, the sub-spacers 12 of Example #2 have a lower structure 12L including layers 5b, 7b and 8b that are made of the same films as the light-shield layer 5 and the red and green color filters 7 and 8, respectively, and an upper structure 12U made of the same film as the orientation controlling protrusions 13 as shown in FIGS. 11A and 11B.

As shown in Table 2, since Examples #1 and #2 use mutually different color filter materials, the light-shield layer 5 and the red, green and blue color filters 7, 8 and 9 have different thicknesses (normal portion thicknesses) between Examples #1 and #2. Nevertheless, the main spacers 11 have the same height and the same size in both of Examples #1 and #2 and the sub-spacers 12 also have the same height and the same size in these two Examples #1 and #2. Thus, the present inventors confirmed that even when different color materials were used, columnar spacers of the same height and the same size could still be formed according to preferred embodiments of the present invention.

As can be seen from Table 2, in Comparative Example #4, both the upper structure of the main spacers and that of the sub-spacers are made of the same film as the orientation controlling protrusions. Also, in Comparative Example #4, the main spacers include a layer that is made of the same film as the blue color filters but the sub-spacers include no such layers. In this manner, according to Comparative Example #4, the heights of the main and sub-spacers are changed by providing or not providing such a layer that is made of the same film as the blue color filters. However, generally speaking, the thickness of a color filter is automatically determined by the color purity of the color to display. That is why it is difficult to precisely control the height of the columnar spacers by such a technique. As a result, the main spacer had an excessive height of 3.8 μm.

In Comparative Example #5, the excessive height of the main spacers in Comparative Example #4 is tentatively decreased by reducing the areas of the layers that are made of the same films as the green and blue color filters, respectively. According to Comparative Example #5, however, the height of the main spacers could be decreased to a desired value of 3.5 μm but their size also decreased, thus decreasing the withstand load of the main spacers. As a result, when load was placed on such a panel, the main spacers deformed plastically even before the sub-spacers contacted with the active-matrix substrate.

In Preferred Embodiment 1 and Preferred Embodiment 2, the upper structure 11U of the main spacers 11 and the upper structure 12U of the sub-spacers 12 both have a single-layer structure. However, the present invention is in no way limited to those specific preferred embodiments. Alternatively, the upper structure 11U of the main spacers 11 or the upper structure 12U of the sub-spacers 12 may also have a two-layer structure.

Figure 12A:
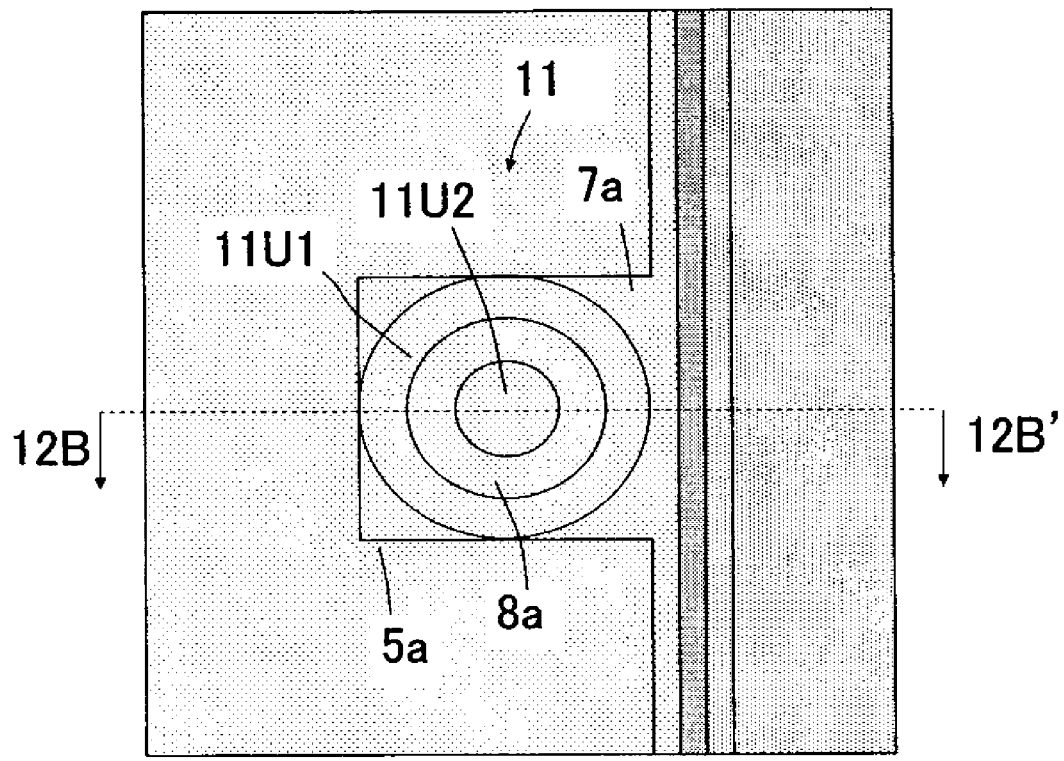
FIGS. 12A and 12B are respectively a top view, and a cross-sectional view as viewed along the plane 12B-12B' shown in FIG. 12A, schematically illustrating another exemplary main spacer for use in the liquid crystal display device according to a preferred embodiment of the present invention.
Figure 12B:
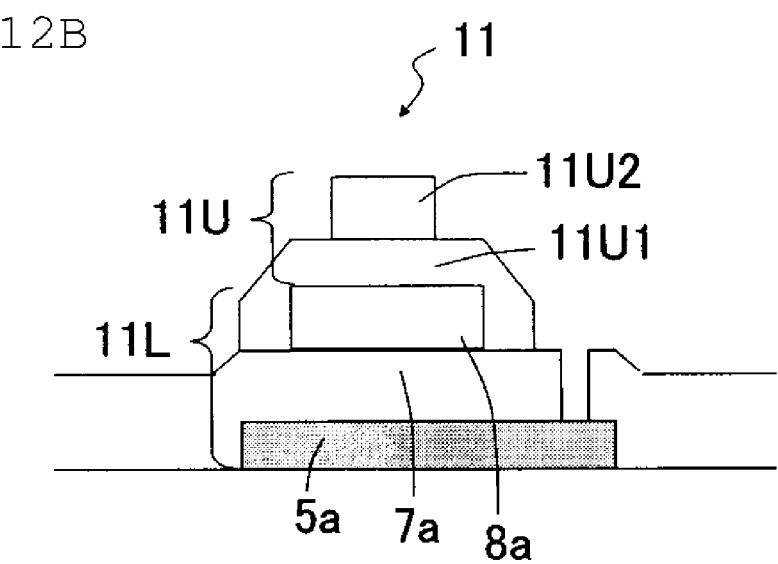

For example, as shown in FIGS. 12A and 12B, the upper structure 11U of the main spacers 11 may include a layer 11U1 made of the same film as the orientation controlling protrusions 13 and another layer 11U2 made of a resin separately from the protrusions 13.

Figure 13A:
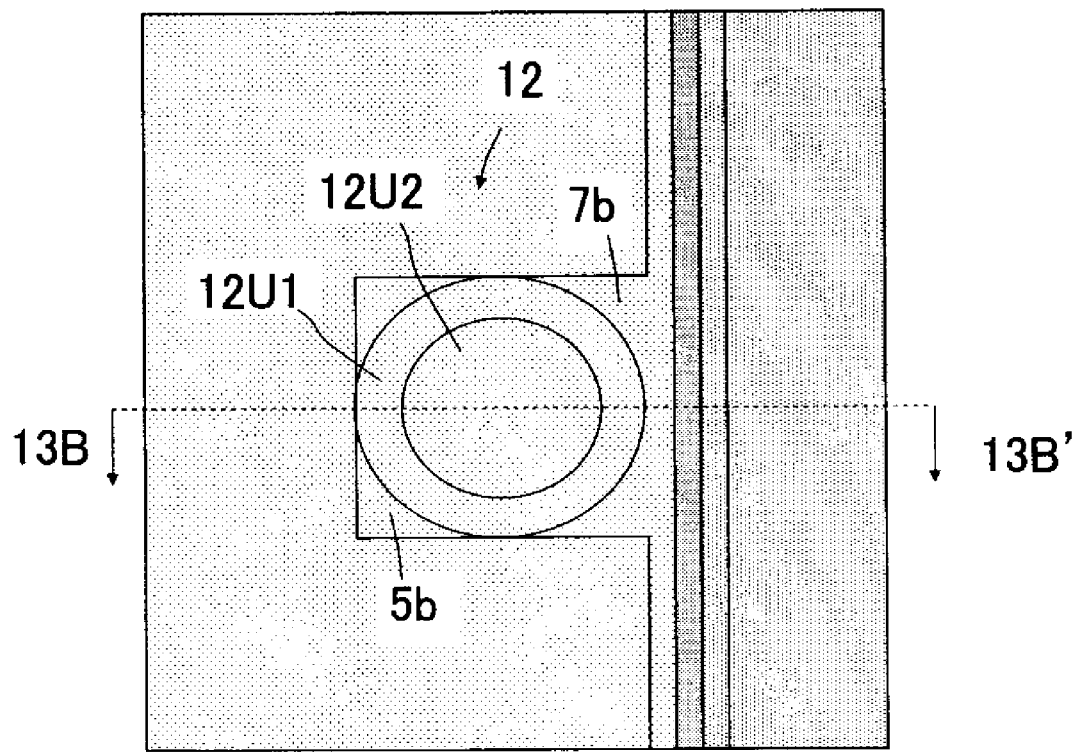
FIGS. 13A and 13B are respectively a top view, and a cross-sectional view as viewed along the plane 13B-13B' shown in FIG. 13A, schematically illustrating another exemplary sub-spacer for use in the liquid crystal display device according to a preferred embodiment of the present invention.
Figure 13B:
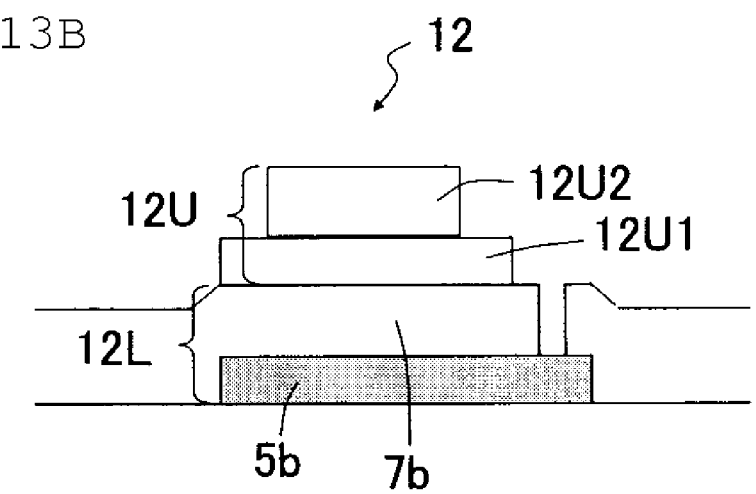

Alternatively, as shown in FIGS. 13A and 13B, the upper structure 12U of the sub-spacers 12 may include a layer 12U1 made of the same film as the orientation controlling protrusions 13 and another layer 12U2 made of a resin separately from the protrusions 13.

However, in order to control the height of the main spacers 11 and that of the sub-spacers 12 to two arbitrary values independently of each other, if one of the two upper structures 11U and 12U of the main and sub-spacers 11 and 12 has a two-layer structure, the other upper structure preferably has a single-layer structure. More preferably, the other upper structure does not include any layer that is made of the same film as the protrusions 13.

Preferred Embodiment 3

Figure 14:
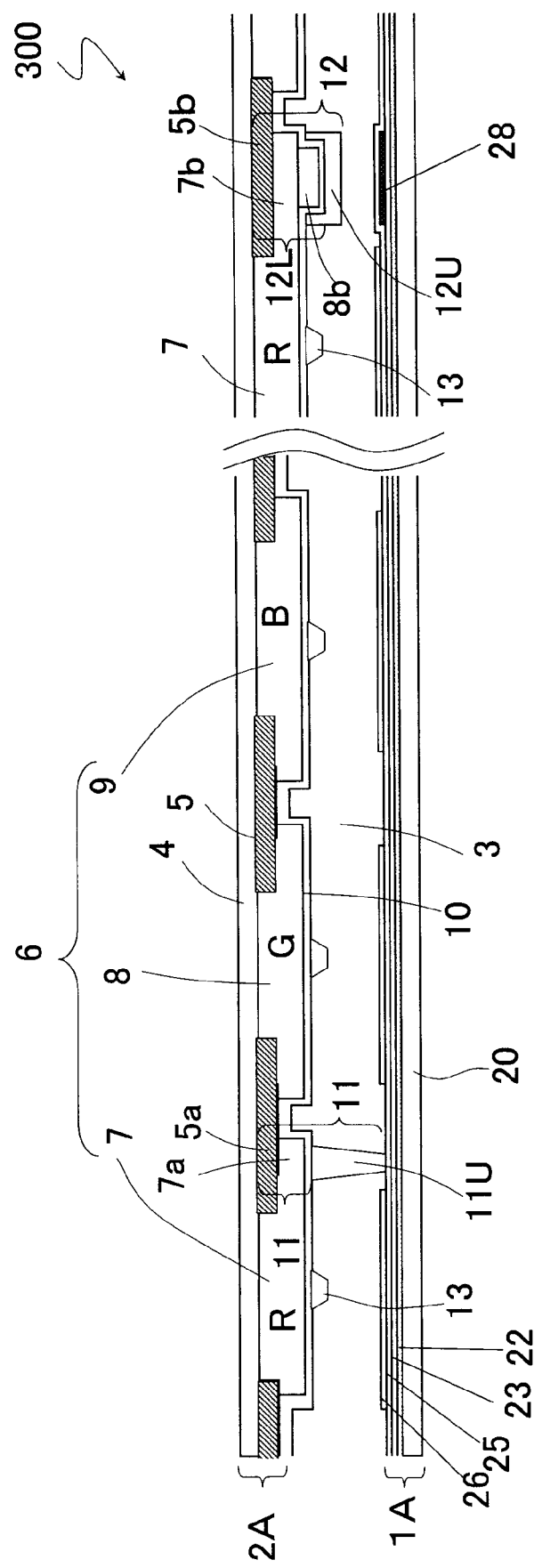
FIG. 14 is a cross-sectional view schematically illustrating a liquid crystal display device according to another preferred embodiment of the present invention.
Figure 15:
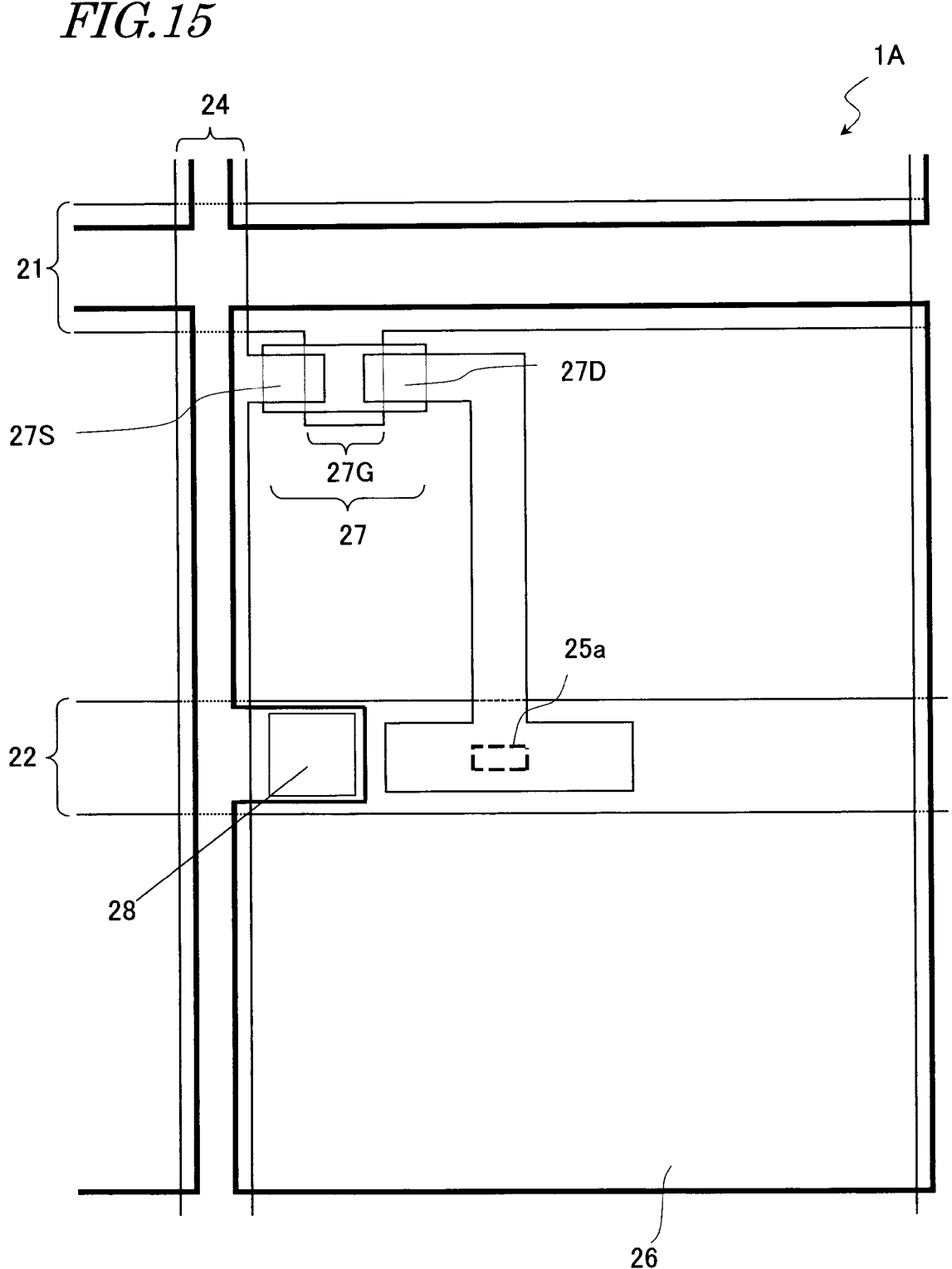
FIG. 15 is a top view schematically illustrating the active-matrix substrate of a liquid crystal display device according to a preferred embodiment of the present invention.

Hereinafter, the structure of a liquid crystal display device 300 of this preferred embodiment will be described with reference to FIGS. 14 and 15. FIG. 14 is a cross-sectional view schematically illustrating the liquid crystal display device 300 and FIG. 15 is a plan view schematically illustrating the active-matrix substrate 1A of the liquid crystal display device 300. The following description will be focused on the differences between the liquid crystal display device 300 and the liquid crystal display device 200 of Preferred Embodiment 2.

On the active-matrix substrate 1A of the liquid crystal display device 300, a TFT (thin-film transistor) 27 is provided for each picture element. The TFT 27 has its gate electrode 27G electrically connected to a scan line (gate line) 21, which is arranged on a transparent substrate (such as a glass substrate) 20, its source electrode 27S electrically connected to a signal line (source line) 24, which intersects with the scan line 21 with a gate insulating film 23 interposed, and its drain electrode 27D electrically connected to a picture element electrode 26 through a contact hole 25a. The hole 25a has been cut through an interlayer dielectric film 25 that covers the signal lines 24 and the TFTs 27. In this example, the contact hole 25a is located over a storage capacitor line 22.

The interlayer dielectric film 25 may be made of a photosensitive acrylic resin, for example. If the picture element electrode 26 is arranged on this interlayer dielectric film 25 as is done in this preferred embodiment, the picture element electrode 26 can be arranged so as to partially overlap with the scan line 21 and/or the signal line 24. As a result, the aperture ratio can be increased.

The active-matrix substrate 1A of this preferred embodiment includes a gap adjusting layer 28, which is selectively arranged so as to face the sub-spacers 12. This gap adjusting layer 28 is arranged so as to adjust the gap between the sub-spacers 12 and the surface of the active-matrix substrate 1A, and is not provided so as to face the main spacers 11. The gap adjusting layer 28 of this embodiment is made of the same film as the signal lines 24 (i.e., a so-called "source metal").

If the gap adjusting layer 28 is provided as is done in this preferred embodiment, the gap between the sub-spacers 12 and the surface of the active-matrix substrate 1A can be easily adjusted to a preferred value for increasing the withstand load. In other words, even if the sub-spacers 12 cannot be tall enough, the deficit in height can be compensated for by the gap adjusting layer 28 and sufficiently high withstand load is realized.

It should be noted that the gap adjusting layer 28 does not have to be made of the same film as the signal lines 24. Alternatively, the gap adjusting layer 28 may also be made of the same film as the scan lines 21 (i.e., a so-called "gate metal") or the same semiconductor layer as the one included in the TFTs 27. From the standpoint of electrical reliability, the gap adjusting layer 28 is preferably electrically floating and isolated from the lines as shown in FIG. 15.

Also, in this preferred embodiment, the gap adjusting layer 28 is arranged so as to overlap with the storage capacitor line 22 and the picture element electrode 26 has a notch so as not to overlap with this gap adjusting layer 28 as shown in FIG. 15. This arrangement is adopted in order to improve the electrical reliability of the display device by avoiding overlap between the sub-spacers 12 and the picture element electrodes 26. Since the area over the storage capacitor line 22 does not contribute to the display operation, no problem would arise during the display operation even if the picture element electrode 26 has such a notch in that area.

Figure 16:
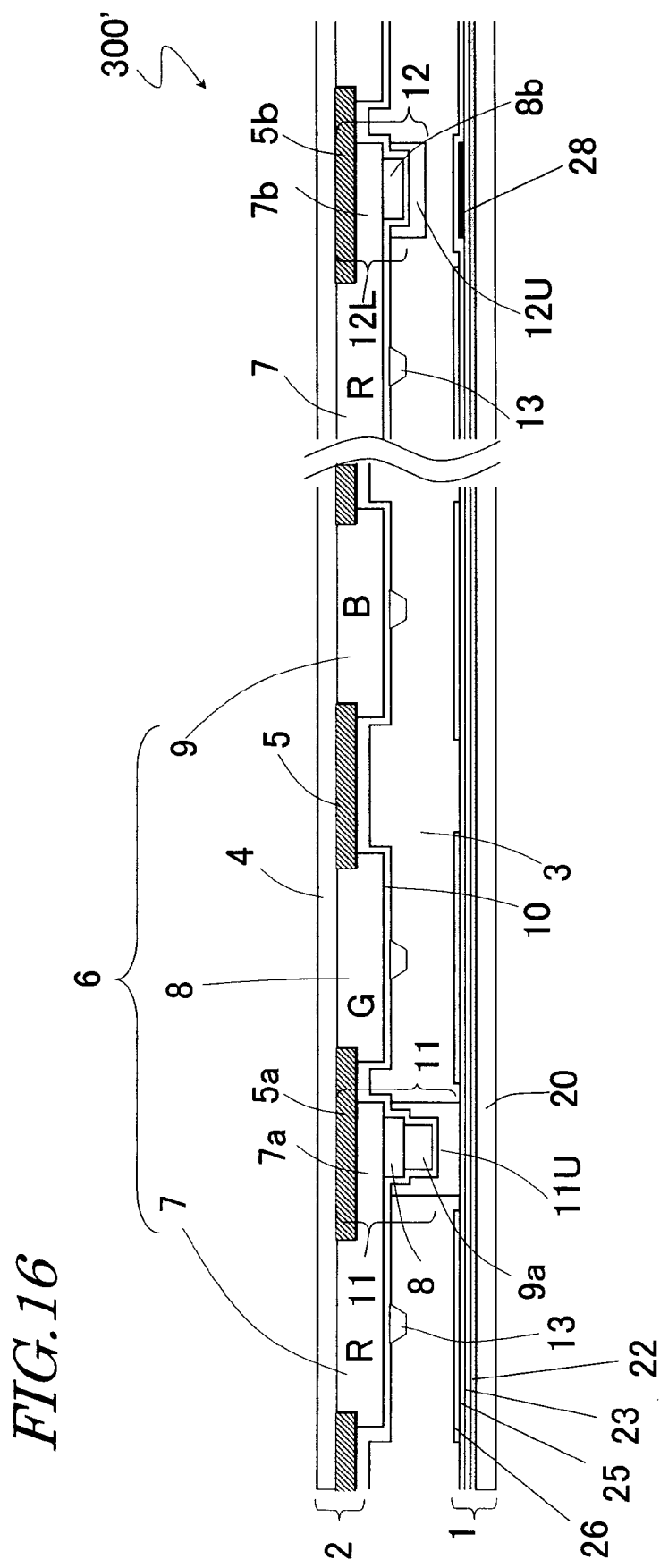
FIG. 16 is a cross-sectional view schematically illustrating a liquid crystal display device according to another preferred embodiment of the present invention.

The technique of providing the gap adjusting layer 28 as is done in this preferred embodiment is also effectively applicable to the liquid crystal display device 300' shown in FIG. 16. In the liquid crystal display device 300' shown in FIG. 16, both of the upper structures 11U and 12U of the main and sub-spacers 11 and 12 are made of the same film as the orientation controlling protrusions 13. That is why in this liquid crystal display device 300', it is more difficult to control the heights of the main and sub-spacers 11 and 12 independently of each other than in the liquid crystal display devices 100 and 200 of Preferred Embodiment 1 and Preferred Embodiment 2. However, by providing the gap adjusting layer 28, the height of the sub-spacers 12 can be compensated for and good withstand load can be achieved easily.

Preferred Embodiment 4

As described above, by providing two types of columnar spacers with mutually different heights, the withstand load can be increased with the low-temperature bubbling minimized. However, if those two types of columnar spacers have different multilayer structures, then some unevenness could be produced in the image displayed. Hereinafter, such a phenomenon will be described more specifically with reference to FIGS. 17 and 18.

Figure 17A:
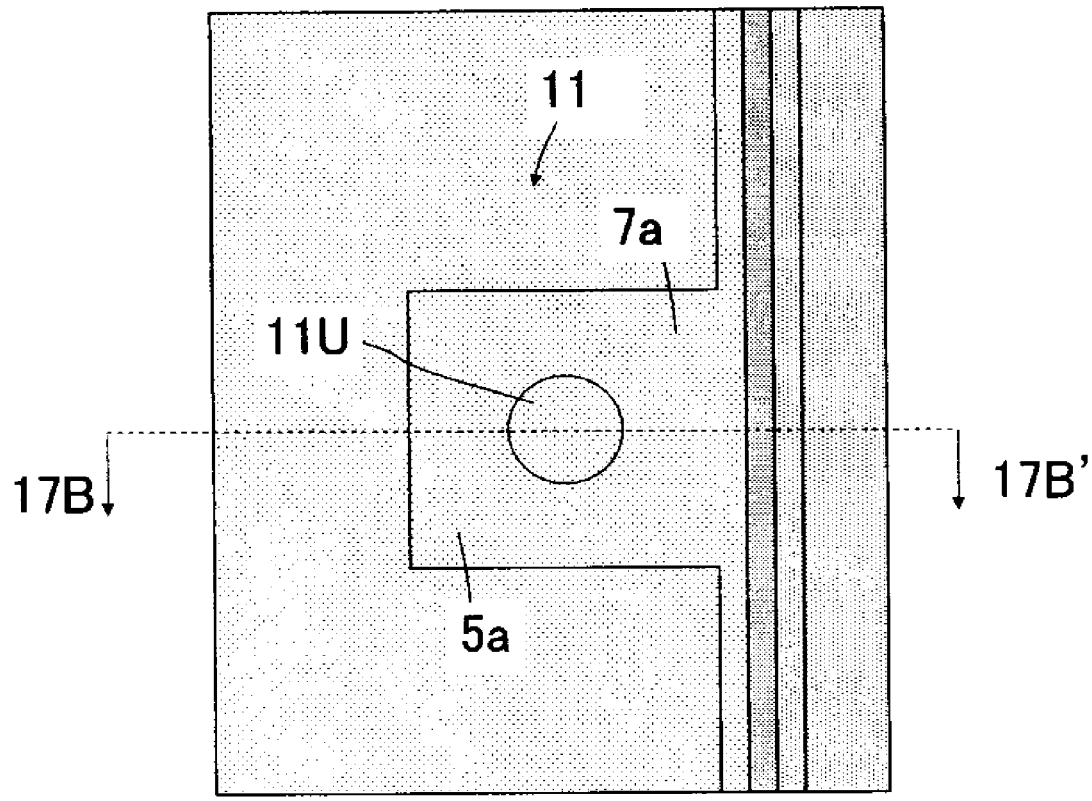
FIGS. 17A and 17B are respectively a top view, and a cross-sectional view as viewed on the plane 17B-17B' shown in FIG. 17A, schematically illustrating an exemplary main spacer.
Figure 17B:
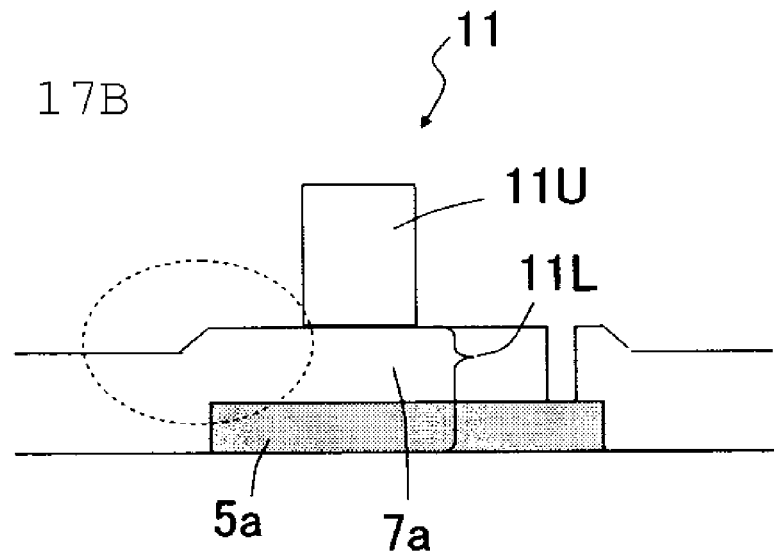

The main spacer 11 shown in FIGS. 17A and 17B has a lower structure 11L including layers 5a and 7a, which are made of the same films as the light-shield layer 5 and the red color filters 7, respectively, and an upper structure 11U made of a resin (typically a negative photosensitive resin).

Figure 18A:
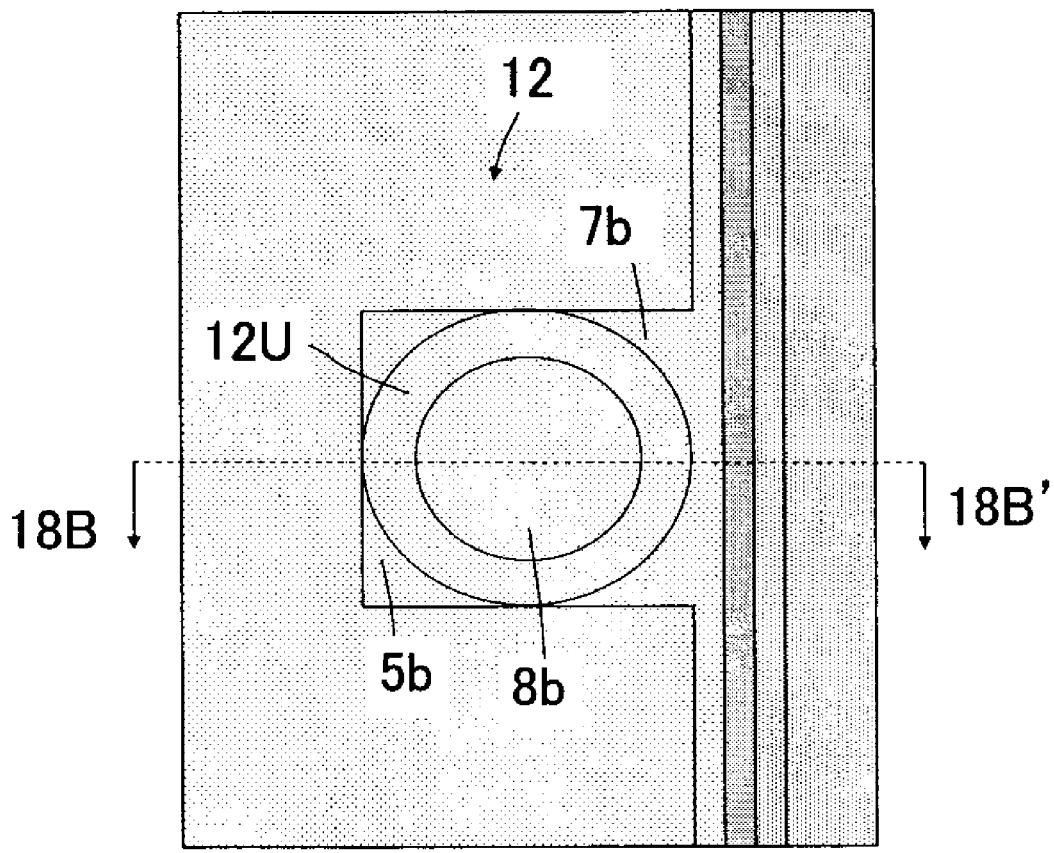
FIGS. 18A and 18B are respectively a top view, and a cross-sectional view as viewed on the plane 18B-18B' shown in FIG. 18A, schematically illustrating an exemplary sub-spacer.
Figure 18B:
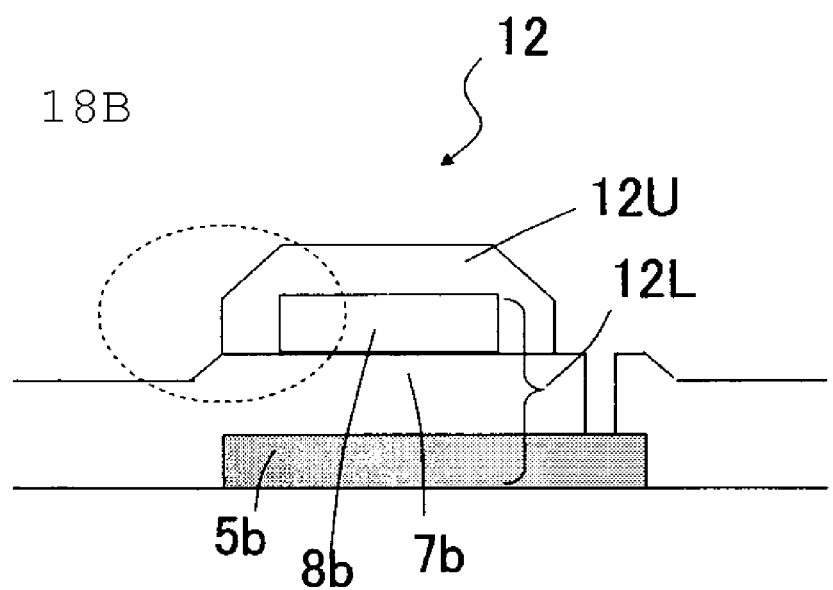

On the other hand, the sub-spacer 12 shown in FIGS. 18A and 18B has a lower structure 12L consisting of layers 5b, 7b and 8b, which are made of the same films as the light-shield layer 5, the red color filters 7 and the green color filters 8, respectively, and an upper structure 12U made of the same film as the orientation controlling protrusions 13 (typically a positive photosensitive resin).

Comparing FIGS. 17B and 18B to each other, it can be seen that the shape of the level difference near the main spacer 11 (as encircled by the dots in FIG. 17B) and that of the level difference near the sub-spacer 12 (as encircled by the dots in FIG. 18B are different from each other. That is why liquid crystal molecules located near the main spacer 11 have a different orientation state from those located near the sub-spacer 12. Due to such a difference in orientation state, some unevenness or non-smoothness could be produced in the image displayed.

Figure 19A:
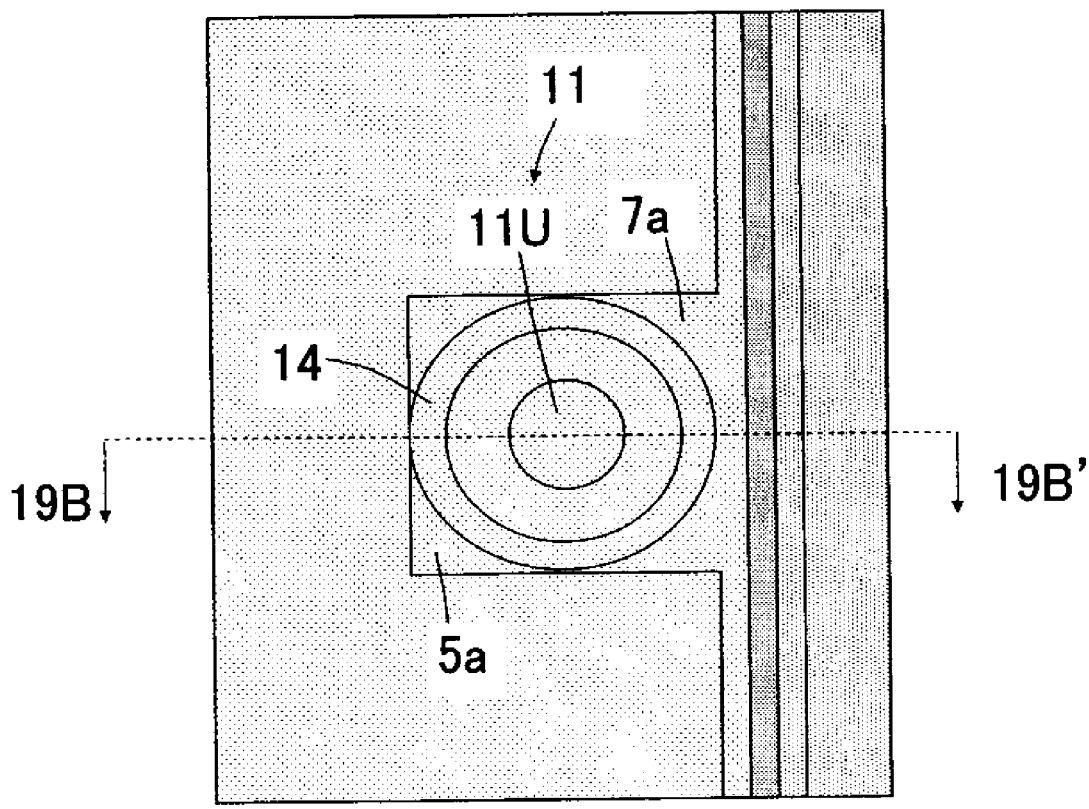
FIGS. 19A and 19B are respectively a top view, and a cross-sectional view as viewed on the plane 19B-19B' shown in FIG. 19A, schematically illustrating a structure arranged near the main spacer.
Figure 19B:
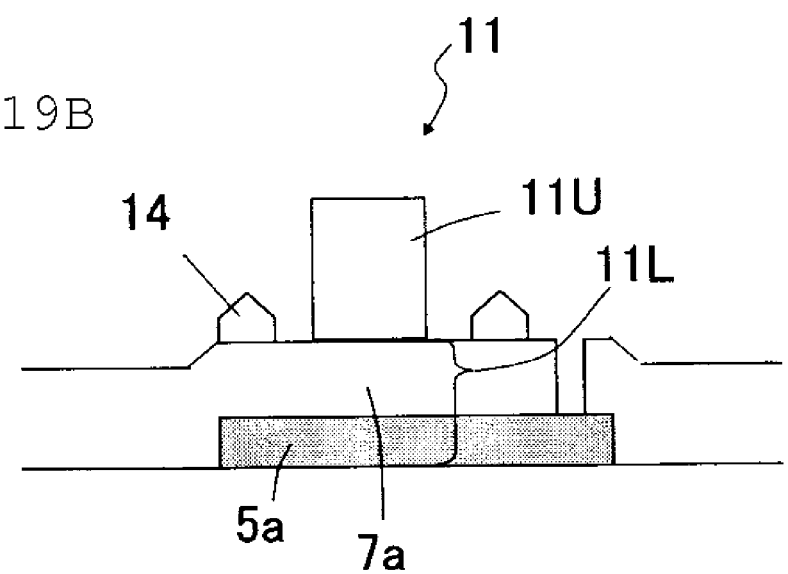

If a structure 14, which is made of the same film as the protrusions 13, is provided near the main spacer 11 as shown in FIGS. 19A and 19B, then the shape of the level difference near the main spacer 11 can be similar to that of the level difference near the sub-spacer 12. As a result, such unevenness or non-smoothness due to the difference in orientation state can be eliminated from the image displayed.

Figure 20A:
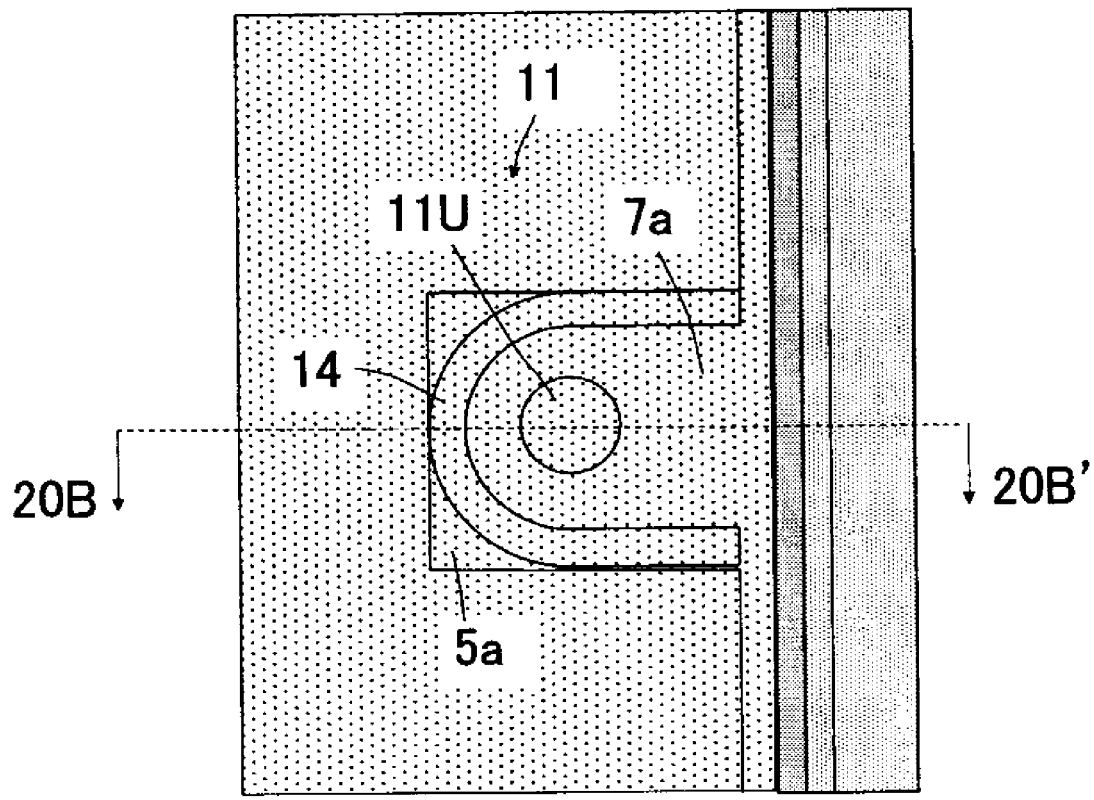
FIGS. 20A and 20B are respectively a top view, and a cross-sectional view as viewed on the plane 20B-20B' shown in FIG. 20A, schematically illustrating another exemplary structure arranged near the main spacer.
Figure 20B:
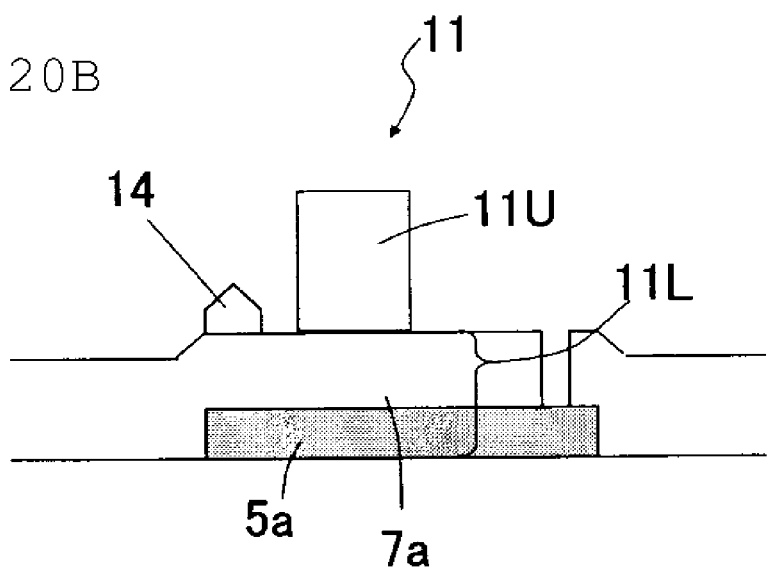
Figure 21A:
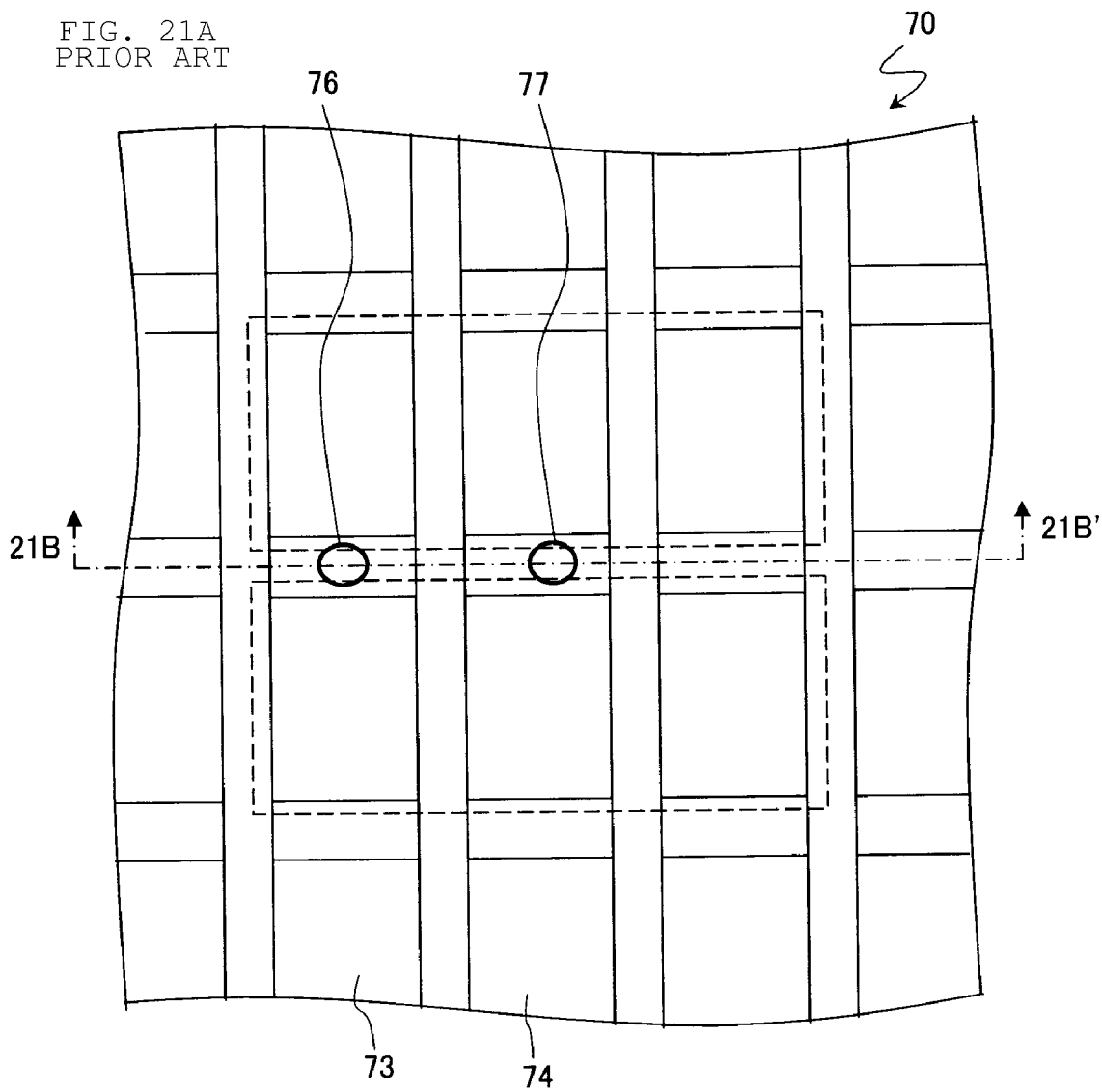
FIGS. 21A and 21B are respectively a top view, and a cross-sectional view as viewed on the plane 21B-21B' shown in FIG. 21A, schematically illustrating a conventional color filter substrate.
Figure 21B:
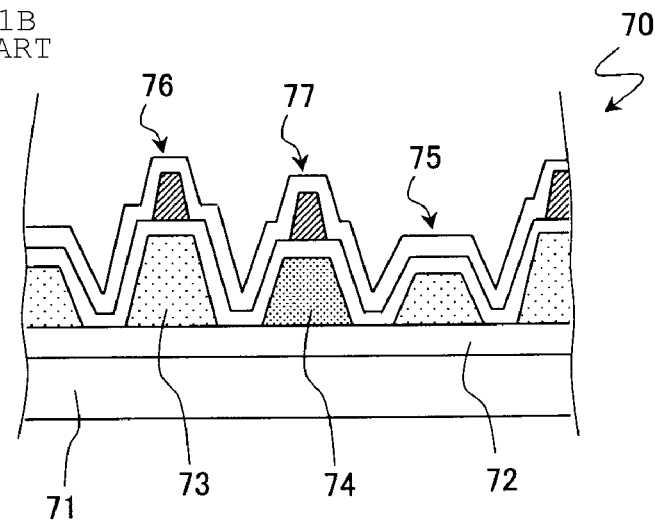

In the example illustrated in FIG. 19, the structure 14 is arranged so as to have a ring shape when viewed along a normal to the substrate plane. However, the structure 14 does not have to have such a shape. Alternatively, the structure 14 may also be arranged so as to have a U shape when viewed along a normal to the substrate plane as shown in FIGS. 20A and 20B.

Various preferred embodiments of the present invention provides a color filter substrate that can arbitrarily control the heights of columnar spacers by a simple manufacturing process. A color filter substrate according to preferred embodiments of the present invention can be used effectively in a liquid crystal display device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device comprising:
an active-matrix substrate including a plurality of switching elements that are arranged in a matrix;
a color filter substrate, which is arranged so as to face the active-matrix substrate; and
a liquid crystal layer, which is interposed between the active-matrix substrate and the color filter substrate; wherein
the color filter substrate includes:
a transparent substrate;
a color filter layer, which is arranged on the transparent substrate; and
a plurality of columnar spacers sticking out of the transparent substrate; wherein
the columnar spacers include first and second types of columnar spacers with mutually different heights;
the active-matrix substrate further includes a gap adjusting layer, which is selectively arranged only at the shorter one of the two types of columnar spacers so as to face the shorter one of the two types of columnar spacers and adjust the gap between those shorter columnar spacers and the surface of the active-matrix substrate; and the active-matrix substrate further includes a plurality of gate lines and a plurality of source lines that intersect with the gate lines, and the gap adjusting layer is made of the same film as that of either of the gate lines or the source lines.

2. The color filter substrate of claim 1, wherein the first type of columnar spacers are arranged at a higher density than the second type of columnar spacers.

3. The color filter substrate of claim 1, wherein the first upper structure further includes a layer made of the resin.

4. The color filter substrate of claim 1, wherein the second upper structure includes no layers that are made of the same film as the protrusion.

5. The color filter substrate of claim 1, further comprising a structure that is made of the same film as the protrusion in the vicinity of the second type of columnar spacers.

6. The color filter substrate of claim 1, wherein the resin is a photosensitive resin.

7. The color filter substrate of claim 6, wherein the resin is a negative photosensitive resin, and the protrusion is made of a positive photosensitive resin.

8. A liquid crystal display device comprising:
the color filter substrate of claim 1;
an active-matrix substrate, which is arranged so as to face the color filter substrate; and
a liquid crystal layer, which is interposed between the color filter substrate and the active-matrix substrate.

9. The liquid crystal display device of claim 8, wherein the active-matrix substrate includes a plurality of switching elements that are arranged in matrix and a plurality of picture element electrodes, each of which is electrically connected to an associated one of the switching elements, and the columnar spacers are arranged so as not to overlap with the picture element electrodes.

10. The liquid crystal display device of claim 8, wherein the active-matrix substrate further includes a gap adjusting layer, which is selectively arranged so as to face the shorter one of the two types of columnar spacers and adjust the gap between those shorter columnar spacers and the surface of the active-matrix substrate.

11. The liquid crystal display device of claim 10, wherein the active-matrix substrate further includes a plurality of gate lines and a plurality of source lines that intersect with the gate lines, and the gap adjusting layer is made of the same film as that of either the gate lines or the source lines.

12. The liquid crystal display device of claim 10, wherein the active-matrix substrate includes a plurality of thin-film transistors, and the gap adjusting layer is made of the same semiconductor layer as that of each of said thin-film transistors.

13. A liquid crystal display device comprising:
an active-matrix substrate including a plurality of switching elements that are arranged in a matrix;
a color filter substrate, which is arranged so as to face the active-matrix substrate; and
a liquid crystal layer, which is interposed between the active-matrix substrate and the color filter substrate; wherein the color filter substrate includes:
a transparent substrate;
a color filter layer, which is arranged on the transparent substrate; and
a plurality of columnar spacers sticking out of the transparent substrate; wherein
the columnar spacers include first and second types of columnar spacers with mutually different heights;
the active-matrix substrate further includes a gap adjusting layer, which is selectively arranged only at the shorter one of the two types of columnar spacers so as to face the shorter one of the two types of columnar spacers and adjust the gap between those shorter columnar spacers and the surface of the active-matrix substrate; and
the switching elements are thin-film transistors, and the gap adjusting layer is made of the same semiconductor layer as that included in each of said thin-film transistors.

14. The color filter substrate of claim 13, wherein the first type of columnar spacers are arranged at a higher density than the second type of columnar spacers.

15. The color filter substrate of claim 13, wherein the first upper structure further includes a layer made of the resin.

16. The color filter substrate of claim 13, wherein the second upper structure includes no layers that are made of the same film as the protrusion.

17. The color filter substrate of claim 13, further comprising a structure that is made of the same film as the protrusion in the vicinity of the second type of columnar spacers.

18. The color filter substrate of claim 13, wherein the resin is a photosensitive resin.

19. The color filter substrate of claim 18, wherein the resin is a negative photosensitive resin, and the protrusion is made of a positive photosensitive resin.

20. A liquid crystal display device comprising:
the color filter substrate of claim 13;
an active-matrix substrate, which is arranged so as to face the color filter substrate; and
a liquid crystal layer, which is interposed between the color filter substrate and the active-matrix substrate.

21. The liquid crystal display device of claim 20, wherein the active-matrix substrate includes a plurality of switching elements that are arranged in matrix and a plurality of picture element electrodes, each of which is electrically connected to an associated one of the switching elements, and the columnar spacers are arranged so as not to overlap with the picture element electrodes.

22. The liquid crystal display device of claim 20, wherein the active-matrix substrate further includes a gap adjusting layer, which is selectively arranged so as to face the shorter one of the two types of columnar spacers and adjust the gap between those shorter columnar spacers and the surface of the active-matrix substrate.

23. The liquid crystal display device of claim 22, wherein the active-matrix substrate further includes a plurality of gate lines and a plurality of source lines that intersect with the gate lines, and the gap adjusting layer is made of the same film as that of either the gate lines or the source lines.

24. The liquid crystal display device of claim 22, wherein the active-matrix substrate includes a plurality of thin-film transistors, and the gap adjusting layer is made of the same semiconductor layer as that of each of said thin-film transistors.

* * * * *